United States Patent
Herre et al.

(10) Patent No.: US 11,863,962 B2
(45) Date of Patent: Jan. 2, 2024

(54) CONCEPT FOR GENERATING AN ENHANCED SOUND-FIELD DESCRIPTION OR A MODIFIED SOUND FIELD DESCRIPTION USING A MULTI-LAYER DESCRIPTION

(71) Applicant: Fraunhofer-Gesellschaft zur Foerderung der angewandten Forschung e.V., Munich (DE)

(72) Inventors: Jürgen Herre, Erlangen (DE); Emanuel Habets, Erlangen (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 0 days.

(21) Appl. No.: 17/336,202

(22) Filed: Jun. 1, 2021

(65) Prior Publication Data
US 2021/0289310 A1    Sep. 16, 2021

Related U.S. Application Data

(63) Continuation of application No. 16/733,662, filed on Jan. 3, 2020, now Pat. No. 11,153,704, which is a
(Continued)

(30) Foreign Application Priority Data

Jul. 14, 2017  (EP) .................................. 17181484

(51) Int. Cl.
  *H04S 7/00*   (2006.01)
  *G10L 19/008*   (2013.01)
  *H04S 3/00*   (2006.01)
(52) U.S. Cl.
  CPC .......... *H04S 7/303* (2013.01); *G10L 19/008* (2013.01); *H04S 3/008* (2013.01); *H04S 2400/01* (2013.01);
(Continued)

(58) Field of Classification Search
None
See application file for complete search history.

(56) References Cited

U.S. PATENT DOCUMENTS 4,042,779 A    8/1977 Craven et al.
9,196,257 B2   11/2015 Schultz-amling et al.
(Continued)

FOREIGN PATENT DOCUMENTS

CN   102326417 A   1/2012
CN   102859584 A   1/2013
(Continued)

OTHER PUBLICATIONS

Yulin, Peng, "[Uploaded in 4 parts] Study on Several Algorithms for Three-Dimension Audio", China's outstanding master's academic dissertation full text database (Information Technology), Aug. 15, 2013 (62 pp.), 15 pp.
(Continued)

*Primary Examiner* — Mark Fischer
(74) *Attorney, Agent, or Firm* — Perkins Coie LLP; Michael A. Glenn

(57) ABSTRACT

An apparatus for generating an enhanced sound field description has: a sound field generator for generating at least two sound field layer descriptions indicating sound fields with respect to at least one reference location; and a meta data generator for generating meta data relating to spatial information of the sound fields, wherein the sound field descriptions and the meta data constitute the enhanced sound field description. The meta data can be a geometrical information for each layer such as a representative distance to the reference location.

13 Claims, 19 Drawing Sheets

Related U.S. Application Data continuation of application No. PCT/EP2018/069145, filed on Jul. 13, 2018.

(52) U.S. Cl.
CPC ....... *H04S 2400/15* (2013.01); *H04S 2420/01* (2013.01); *H04S 2420/11* (2013.01)

(56) References Cited

U.S. PATENT DOCUMENTS

| | | | |
|---|---|---|---|
| 9,769,588 | B2 | 9/2017 | Shenoy et al. |
| 2007/0274528 | A1 | 11/2007 | Nakamoto et al. |
| 2011/0305344 | A1 | 12/2011 | Sole et al. |
| 2012/0155653 | A1 | 6/2012 | Jax et al. |
| 2013/0016842 | A1 | 1/2013 | Schultz-amling et al. |
| 2013/0142341 | A1 | 6/2013 | Del Galdo et al. |
| 2013/0216070 | A1 | 8/2013 | Keiler et al. |
| 2014/0023197 | A1 | 1/2014 | Xiang et al. |
| 2014/0133660 | A1 | 5/2014 | Jax et al. |
| 2014/0241528 | A1 | 8/2014 | Gunawan et al. |
| 2014/0249827 | A1 | 9/2014 | Sen et al. |
| 2014/0355766 | A1 | 12/2014 | Morrell et al. |
| 2014/0358557 | A1 | 12/2014 | Sen et al. |
| 2014/0358567 | A1 | 12/2014 | Koppens et al. |
| 2015/0127354 | A1 | 5/2015 | Peters et al. |
| 2015/0223002 | A1 | 8/2015 | Mehta et al. |
| 2015/0271621 | A1 | 9/2015 | Sen et al. |
| 2015/0296319 | A1 | 10/2015 | Shenoy et al. |
| 2016/0142851 | A1 | 5/2016 | Sun et al. |
| 2016/0309273 | A1 | 10/2016 | Keiler et al. |
| 2017/0125030 | A1 | 5/2017 | Koppens et al. |
| 2017/0243589 | A1 | 8/2017 | Krueger et al. |
| 2018/0206057 | A1* | 7/2018 | Kim ..................... G10L 19/008 |
| 2018/0359594 | A1 | 12/2018 | Maeno et al. |

FOREIGN PATENT DOCUMENTS

| | | |
|---|---|---|
| CN | 103250207 A | 8/2013 |
| CN | 103460285 A | 12/2013 |
| CN | 103635964 A | 3/2014 |
| CN | 104185869 A | 12/2014 |
| CN | 104244164 A | 12/2014 |
| CN | 105637902 A | 6/2016 |
| CN | 106104680 A | 11/2016 |
| EP | 2346028 A1 | 7/2011 |
| JP | H08107600 A | 4/1996 |
| JP | 2006074589 A | 3/2006 |
| JP | 2013514696 A | 4/2013 |
| JP | 2013545391 A | 12/2013 |
| JP | 2015502573 A | 1/2015 |
| JP | 2015509212 A | 3/2015 |
| KR | 20140000240 A | 1/2014 |
| KR | 20140097555 A | 8/2014 |
| RU | 2609102 C2 | 1/2017 |
| RU | 2015151021 A | 7/2017 |
| TW | 201237849 A | 9/2012 |
| TW | 201334580 A | 8/2013 |
| TW | 201614638 A | 4/2016 |
| WO | 9741711 A1 | 11/1997 |
| WO | 2012072804 A1 | 6/2012 |
| WO | 2013079568 A1 | 6/2013 |
| WO | 2013079663 A2 | 6/2013 |
| WO | 2014015914 A1 | 1/2014 |
| WO | 2014194075 A1 | 12/2014 |
| WO | 2015086337 A1 | 6/2015 |
| WO | 2015107926 A1 | 7/2015 |
| WO | 2016081655 A1 | 5/2016 |
| WO | 2017098949 A1 | 6/2017 |
| WO | 2019013924 A1 | 1/2019 |

OTHER PUBLICATIONS

"ITU-R BS. 1534-3, Method for the subjective assessment of intermediate quality level of audio systems", International Telecommunication Union, 2015, Oct. 2015, 36 pp.

Altman, M, et al., "Immersive Audio for VR", Audio Engineering Society, Oct. 1, 2016, Conference on Audio for Virtual and Augmented Reality, 8 pp.

Anderson, Robert, et al., "Jump: Virtual Reality Video", ACM Transactions on Graphics, 35(6), p. 198, 2016, pp. 198-198:13.

Bates, Enda, et al., "Spatial Music, Virtual Reality, and 360 Media", Audio Eng. Soc. Int. Conf. on Audio for Virtual and Augmented Reality, Los Angeles, CA, U.S.A., 2016, 8 pp.

Blauert, Jens, "[Part 1 of 2]—Spatial Hearing—Revised Edition: The Psychophysics of Human Sound Localization", The MIT Press, 1996, ISBN 0262024136, pp. 93-128.

Blauert, Jens, "[Part 2 of 2]—Spatial Hearing—Revised Edition: The Psychophysics of Human Sound Localization", , 1996, pp. 129-237.

Bleidt, Robert L, et al., "Development of the MPEG-H TV Audio System for ATSC 3.0", IEEE Transactions on Broadcasting; vol. 63, No. 1, Mar. 2017, pp. 202-236, XP055484143, US; ISSN: 0018-9316, Mar. 2017, pp. 202-236.

Bleidt, Robert L., et al., "Development of the MPEG-HTV Audio System for ATSC 3.011", IEEE Transactions on Broadcasting., vol. 63, No. 1, Mar. 2017 (Mar. 2017).

Boehm, Johannes, et al., "Scalable Decoding Mode for MPEG-H3D Audio HOA", 108. MPEG Meeting; Mar. 31, 2014-Apr. 4, 2014; Valencia; (Motion Picture Expert Group or ISO/IECJTC1/SC29/WG11), No. m33195, Mar. 26, 2014 (Mar. 26, 2014), XP030061647, p. 7, paragraph 2.4-p. 11, paragraph 2.5, pp. 7, 11.

Borß, Christian, "A polygon-based panning method for 3D loudspeaker setups", Audio Eng. Soc. Conv., pp. 343-352, Los Angeles, CA, USA, 2014, pp. 343-352.

Engelke, Ulrich, et al., "Psychophysiology-Based QoE Assessment: A Survey", IEEE Selected Topics in Signal Processing, 11(1), pp. 6-21, 2017, pp. 6-21.

Faller, Christof, et al., "Binaural cue coding—Part II: schemes and applications", IEEE Trans On Speech and Audio Proc., vol. 11, No. 6, pp. 299-310.

Faller, Christof, "Parametric multichannel audio coding: Synthesis of coherence cues", IEEE Trans. Speech Audio Process., vol. 14, No. 1, Jan. 2006, pp. 299-310.

Gerzon, Michael A., "Periphony: With-height sound reproduction", J. Acoust. Soc. Am., vol. 21,110. 1, pp. 2-10, 1973, 1973, pp. 2-10.

Johannes, Boehm, et al., "", "Scalable Decoding Mode for MPEG-H 3D Audio HOA", 108. MPEG Meeting; Mar. 31, 2014-Apr. 4, 2014; Valencia; (Motion Picture Expert Group or ISO/IEC JTC1/SC29/WG11), No. m33195, Mar. 26, 2014, XP03006164, Mar. 26, 2014, 12 pages.

Khaddour, Hasan, et al., "A Novel Combined System of Direction Estimation and Sound Zooming of Multiple Speakers", Radioengineering, 24(2), 2015, pp. 583-592.

Kowalczyk, Konrad, et al., "Parametric Spatial Sound Processing: A Flexible and Efficient Solution to Sound Scene Acquisition, Modification, and Reproduction", IEEE Signal Process. Mag., 32(2), pp. 31-42, 2015, pp. 31-42.

Kronlachner, Matthias, et al., "Spatial Transformations for the Enhancement of Ambisonics Recordings", 2nd International Conference on Spatial Audio, Erlangen, Germany, 2014, 5 pp.

Kuttruff, Heinrich, "Room Acoustics", Taylor & Francis, 4 edition, 2000, 369 pp.

Liitola, Toni, "Headphone sound externalization", Ph.D. thesis, Helsinki University of Technology. Department of Electrical and Communications Engineering Laboratory of Acoustics and Audio Signal Processing., 2006, 83 pp.

Merimaa, Juha, "Analysis, Synthesis and Perception of Spatial Sound: Binaural Localization Modeling and Multichannel Loudspeaker Reproduction", Ph.D. thesis, Helsinki University of Technology, 2006, 196 pp.

(56) References Cited

OTHER PUBLICATIONS

Pihlajamaki, Tapani, et al., "Synthesis of Complex Sound Scenes with Transformation of Recorded Spatial Sound in Virtual Reality", JAES, AES, 60 East 42nd Street, Room 2520 New York 10165-2520, USA, vol. 63, No. 7/8, Aug. 18, 2015, pp. 542-551, XP040672137, pp. 542-551.

Pihlajamäki, Tapani, et al., "", Synthesis of Complex Sound Scenes with Transformation of Recorded Spatial Sound in Virtual Reality, Journal of the Audio Engineering Society Papers vol. 63, No. 7/8, Jul./Aug. 2015, Aug. 2015.

Plinge, Axel, et al., "Six-Degrees-of-Freedom Binaural Audio Reproduction of First-Order Ambisonics with Distance Information", Aug. 22, 2018, Conference on Audio for Virtual and Augmented Reality, 10 pp.

Pulkki, Ville, "Directional audio coding in spatial sound reproduction and stereo upmixing", Proc. of the 28th AES International Conference, 2006, 8 pp.

Pulkki, Ville, "Spatial Sound Reproduction with Directional Audio Coding", J. Audio Eng. Soc., 55(6), pp. 503-516, 2007, pp. 503-516.

Pulkki, Ville, "Virtual sound source positioning using vector base amplitude panning", J. Acoust. Soc. A m,, vol. 45, No. 6, pp. 456-466, Jun. 1997, pp. 456-466.

Rummukainen, Olli, et al., "Evaluating Binaural Reproduction Systems from Behavioral Patterns in a Virtual Reality—A Case Study with Impaired Binaural Cues and Tracking Latency", Audio Eng. Soc. Conv. 143, New York, NY, USA, 2017, 8 pp.

Rungta, Atul, et al., "Diffraction Kernels for Interactive Sound Propagation in Dynamic Environments", IEEE Trans. Visualization & Comp. Graphics, 24(4), pp. 1613-1622, 2018, pp. 1613-1622.

Schlecht, Sebastian J, et al., "Sign-Agnostic Matrix Design for Spatial Artificial Reverberation with Feedback Delay Networks", Proc. Audio Eng. Soc. Conf., pp. 1-10—accepted, Tokyo, Japan, 2018, Aug. 6, 2018, pp. 1-10.

Schuijers, Erik, et al., "Low complexity parametric stereo coding", Proc. of the 116th A Es Convention, Berlin, Germany, 2004.

Schuijers, Erik, et al., "Low complexity parametric stereo coding", Proc. of the 116th A Es Convention, Berlin, Germany, 2004, 11 pp.

Tapani, Pihlajamaki, "Synthesis of Complex Sound Scenes with Transformation of Recorded Spatial Sound in Virtual Reality", JAES, AES, 60 East 42nd Street, Room 2520 New York 10165-2520, USA, vol. 63, No. 7/8, Aug. 18, 2015 (Aug. 18, 2015), pp. 542-551, XP040672137, DOI: 10.17743/JAES .2015.0059, p. 542, paragraph 1-p. 547, paragraph 3.3, pp. 542, 547.

Taylor, Micah, et al., "Guided multi-view ray tracing for fast auralization", IEEE Trans. Visualization & Comp. Graphics, 18, pp. 1797-1810, 2012, pp. 1797-1810.

Thiergart, Oliver, et al., "An Acoustical Zoom based on Informed Spatial Filtering", Int. Workshop on Acoustic Signal Enhancement, pp. 109-113, 2014, pp. 109-113.

Thiergart, Oliver, et al., "Geometry-Based Spatial Sound Acquisition using Distributed Microphone Arrays", IEEE Trans. Audio, Speech, Language Process., 21(12), pp. 2583-2594, 2013, pp. 2583-2594.

Thiergart, Oliver, et al., "Three-Dimensional Sound Field Analysis with Directional Audio Coding Based on Signal Adaptive Parameter Estimators", Audio Eng. Soc. Conv. Spatial Audio: Sense the Sound of Space, 2010, 9 pp.

Tsingos, Nicolas, et al., "Perceptual Audio Rendering of Complex Virtual Environments", ACM Transactions on Graphics, 23(3), pp. 249-258, 2004, pp. 249-258.

Tylka, J., et al., "Comparison of techniques for binaural navigation of higher order ambisonics sound fields", Proc. of the AES International Conference on Audio for Virtual and Augmented Reality, New York, Sep. 2016.

Tylka, Joseph G, et al., "Performance of Linear Extrapolation Methods of Virtual Sound Field Navigation", J. Audio Eng. Soc., vol. 68, No. 3, Mar. 2020, pp. 138-156.

Tylka, Joseph G, et al., "Soundfield Navigation using an Array of Higher-Order Ambisonics Microphones", Conference: 2016 AES International Conference on Audio for Virtual and Augmented Reality; Sep. 2016, AES, 60 East 42nd Street, Room 2520 New York 10165-2520, USA, Sep. 21, 2016, XP040681032, Sep. 21, 2016, 10 pp.

Tylka, Joseph G., et al., "Soundfield Navigation using an Array of Higher-Order Ambisonics Microphones", Conference: 2016 AES International Conference on Audio for Virtual and Augmented Reality; Sep. 2016, AES, 60 East 42nd Street, Room 2520 N Ew York, 10165-2520, USA, Sep. 21, 2016 (Sep. 21, 2016).

Yang, Cheng, et al., "A 3D Audio Coding Technique Based on Extracting the Distance Parameter", Jul. 18, 2014, 2014 IEEE International Conference on Multimedia and Expo (ICME), 6 pp.

Zhang, Wen, et al., "Surround by Sound: A Re-view of Spatial Audio Recording and Reproduction", Applied Sciences, 7(5), p. 532, 2017, 532.

Ziegler, Matthias, et al., "Immersive Virtual Reality for Live-Action Video using Camera Arrays", IBC, Amsterdam, Netherlands, 2017, 8 pp.

* cited by examiner

Conversion from multi-layer Ambisonics to traditional Ambisonics.

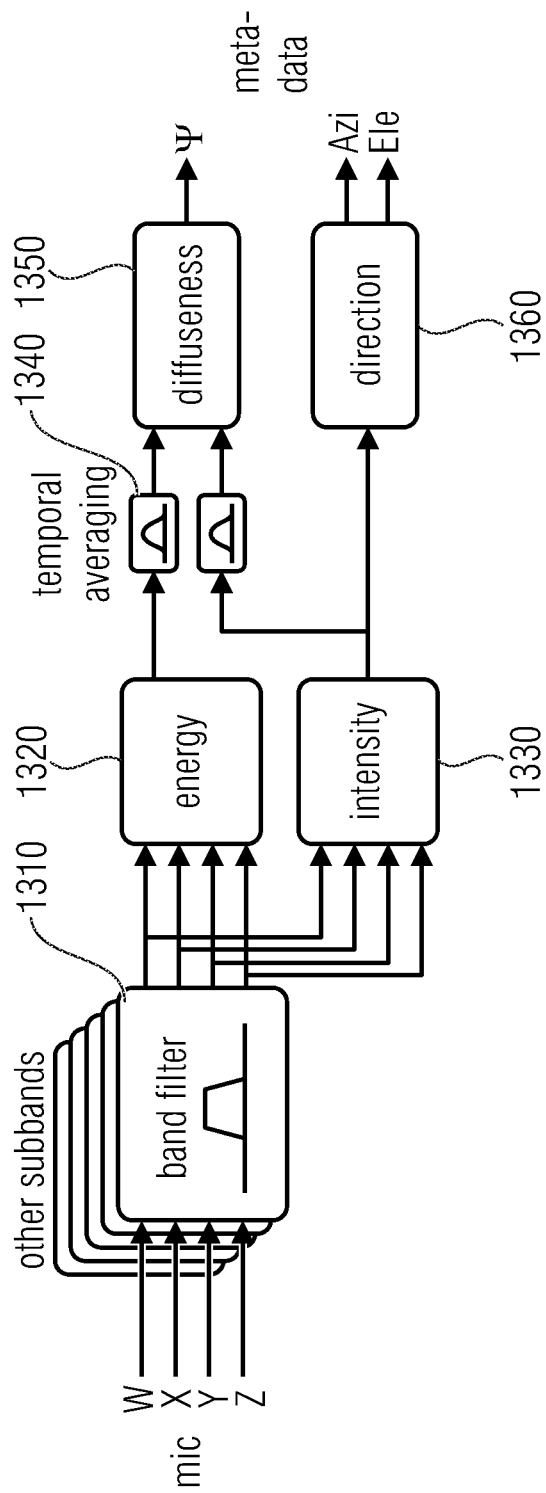
Fig. 12a DirAC analysis

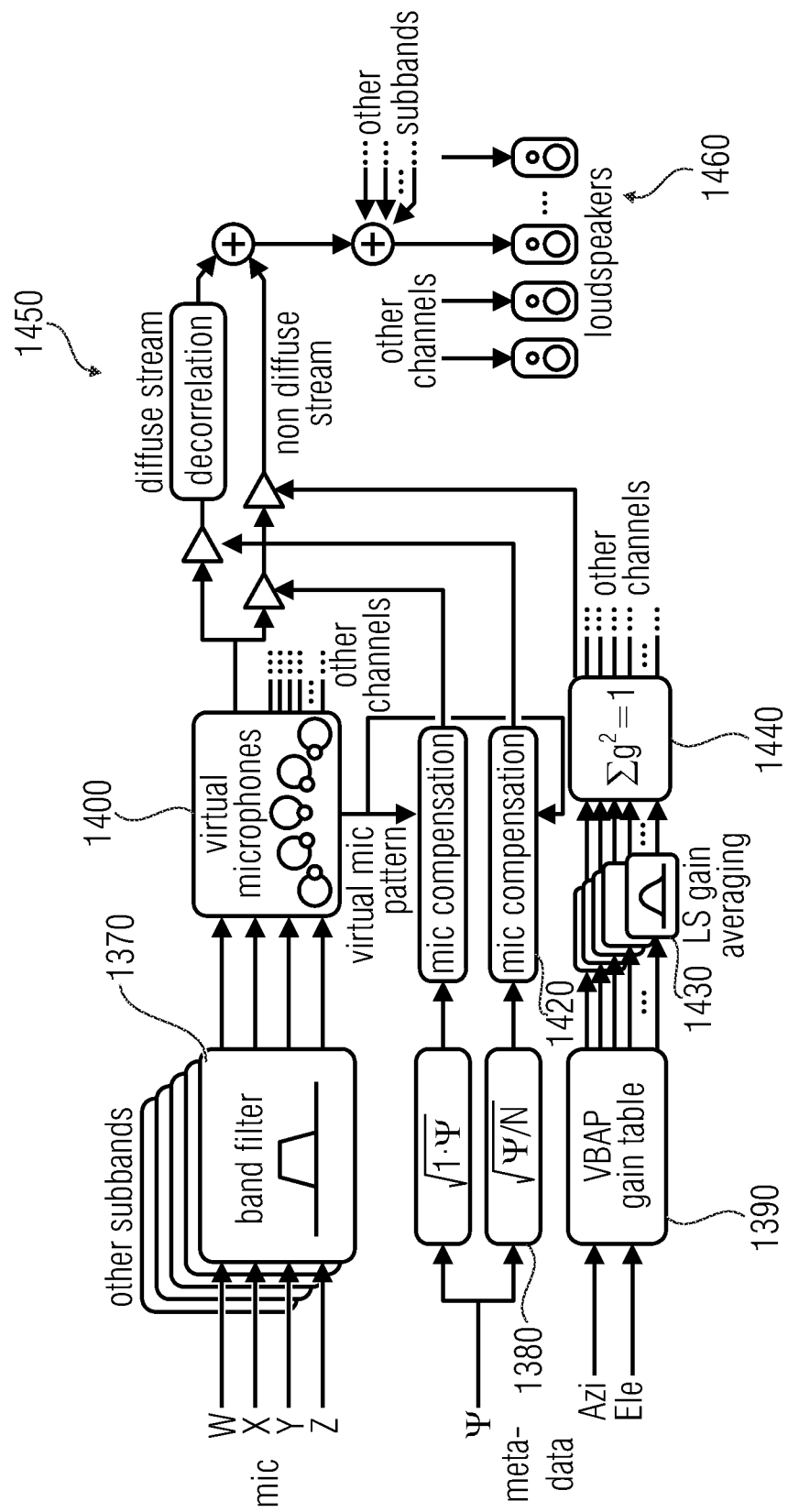
Fig. 12b DirAC synthesis

CONCEPT FOR GENERATING AN ENHANCED SOUND-FIELD DESCRIPTION OR A MODIFIED SOUND FIELD DESCRIPTION USING A MULTI-LAYER DESCRIPTION

CROSS-REFERENCE TO RELATED APPLICATIONS

This application is a continuation of U.S. patent application Ser. No. 16/733,662, filed Jan. 3, 2020, which is a continuation of copending International Application No. PCT/EP2018/069145, filed Jul. 13, 2018, which is incorporated herein by reference in its entirety, and additionally claims priority from European Application No. 17181484.1, filed Jul. 14, 2017, which is also incorporated herein by reference in its entirety.

BACKGROUND OF THE INVENTION

The present invention is related to audio processing and, particularly, audio processing in relation to sound fields that are defined with respect to a reference location such as a microphone or a virtual microphone location.

Ambisonics signals comprise a truncated spherical harmonic decomposition of the sound field. Ambisonics comes in different flavors. There is 'traditional' Ambisonics [31] which today is known as 'First-Order Ambisonics' (FOA) and comprises four signals (i.e., one omnidirectional signal and up to three figure-of-eight directional signals). More recent Ambisonics variants are known as 'Higher-Order Ambisoncis' (HOA) and provide enhanced spatial resolution and larger listener sweet-spot area at the expense of carrying more signals. In general, a fully defined N-th order HOA representation consists of $(N+1)^2$ signals.

Related to the Ambisonics idea, the Directional Audio Coding (DirAC) representation has been conceived to represent a FOA or HOA sound scene in a more compact, parametric style. More specifically, the spatial sound scene is represented by one (or more) transmitted audio channels which represent a downmix of the acoustic scene and associated side information of the direction and diffuseness in each time-frequency (TF) bin. More information on DirAC can be found in [32, 33].

DirAC [32] can be used with different microphone systems and with arbitrary loudspeaker setups. The purpose of the DirAC system is to reproduce the spatial impression of an existing acoustical environment as precisely as possible using a multichannel/3D loudspeaker system. Within the chosen environment, responses (continuous sound or impulse responses) arc measured with an omnidirectional microphone (W) and with a set of microphones that enables to measure the direction-of-arrival of sound and the diffuseness of sound. A common method is to apply three figure-of-eight microphones (X,Y,Z) aligned with the corresponding Cartesian coordinate axes [34]. A way to do this is to use a Sound field microphone, which directly yields all the desired responses. The W, X, Y, and Z signals can also be computed from a set of discrete omnidirectional microphones.

In DirAC, the sound signal is first divided into frequency channels. The sound direction and diffuseness is measured depending on time at each frequency channel. In transmission, one or more audio channels are sent, together with analyzed direction and diffuseness data. In synthesis, the audio which is applied to the loudspeakers can be for example the omnidirectional channel W, or the sound for each loudspeaker can be computed as a weighed sum of W, X, Y, and Z, which forms a signal which has a certain directional characteristics for each loudspeaker. Each audio channel is divided into frequency channels, which are then divided optionally to diffuse and to non-diffuse streams depending on analyzed diffuseness. Diffuse stream is reproduced with a technique, which produces diffuse perception of sound scene, e.g., the decorrelation techniques used in Binaural Cue Coding [35-37]. Non-diffuse sound is reproduced with a technique which aims to produce a point-like virtual source according to the direction data (e.g. VBAP [38]).

Three techniques for navigation in 6DoF with a limited degree-of-freedom are proposed in [39]. Given a single Ambisonics signal, a single Ambisonics signal is computed using: 1) simulating HOA playback and listener movement within a virtual loudspeaker array, 2) computing and translating along plane-waves, and 3) re-expanding the sound field about the listener.

Furthermore, reference is made to the DirAC technology as described, for example, in the publication "Directional Audio Coding—Perception-Based Reproduction of Spatial Sound", V. Pulkki et al, International Workshop on the Principles and Applications of Spatial Hearing, Nov. 11-13, 2009, Zao, Miyagi, Japan. This reference describes directional audio coding as an example for a reference location related sound-field processing particularly as a perceptually motivated technique for spatial audio processing. It has applications in capturing, coding and re-synthesis of spatial sound, in teleconferencing, in directional filtering, and in virtual auditory environments.

Reproduction of sound scenes has often been focusing on loudspeaker setups, as this was the typical reproduction in private, e.g., living room, and professional context, i.e., cinemas. Here, the relation of the scene to the reproduction geometry is static as it accompanies a two-dimensional image that forces the listener to look in the front direction. Subsequently, the spatial relation of the sound and visual objects is defined and fixed at production time.

In virtual reality (VR), the immersion is explicitly achieved by allowing the user to move freely in the scene. Therefore, the user's movement is tracked and the visual and auditory reproduction adjusted to the user's position. Typically, the user is wearing a head-mounted display (HMD) and headphones. For an immersive experience with headphones, the audio has to be binauralized. Binauralization is a simulation of how the human head, ears, and upper torso change the sound of a source depending on its direction and distance. This is achieved by convolution of the signals with head-related transfer functions (HRTFs) for their relative direction [1, 2]. Binauralization also makes the sound appear to be coming from the scene rather than from inside the head [3]. A common scenario that has already been addressed successfully is 360° video reproduction [4, 5]. Here, the user is either wearing an HMD or holding a tablet or phone in his hands. By moving her/his head or the device, the user can look around in any direction. This is a three-degrees-of-freedom (3DoF) scenario, as the user has three movement degrees (pitch, yaw, roll). Visually, this is realized by projecting the video on a sphere around the user. Audio is often recorded with a spatial microphone [6], e.g., first-order Ambisonics (FOA), close to the video camera. In the Ambisonics domain, the user's head rotation is adapted in a straightforward manner [7]. The audio is then for example rendered to virtual loudspeakers placed around the user. These virtual loudspeaker signals are then binauralized.

Modern VR applications allow for six-degrees-of-freedom (6DoF). Additionally to the head rotation, the user can move around resulting in translation of her/his position in three spatial dimensions. The 6DoF reproduction is limited by the overall size of the walking area. In many cases, this area is rather small, e.g., a conventional living room. 6DoF is commonly encountered in VR games. Here, the whole scene is synthetic with computer-generated imagery (CGI). The audio is often generated using object-based rendering where each audio object is rendered with distance-dependent gain and relative direction from the user based on the tracking data. Realism can be enhanced by artificial reverberation and diffraction [8, 9, 10].

Regarding recorded content, there are some distinct challenges for convincing audio-visual 6DoF reproduction. An early example of spatial sound manipulation in the spatial translation domain is that of 'acoustic zoom' techniques [11, 12]. Here, the listener position is virtually moved into the recorded visual scene, similar to zooming into an image. The user chooses one direction or image portion and can then listen to this from a translated point. This entails that all the direction of arrivals (DoAs) are changing relative to the original, non-zoomed reproduction.

Methods for 6DoF reproduction of recorded content have been using spatially distributed recording positions have been proposed. For video, arrays of cameras can be employed to generate light-field rendering [13]. For audio, a similar setup employs distributed microphone arrays or Ambisonics microphones. It has been shown that it is possible to generate the signal of a 'virtual microphone' placed at an arbitrary position from such recordings [14].

In order to realize such spatial sound modifications in a technically convenient way, parametric sound processing or coding techniques can be employed (cf. [15] for an overview). Directional audio coding (DirAC) [16] is a popular method to transform the recording into a representation that consists of an audio spectrum and parametric side information on the sound direction and diffuseness. It is used for acoustic zoom [11] and virtual microphone [14] applications.

The method proposed here enables 6DoF reproduction from the recording of a single FOA microphone. Recordings from a single spatial position have been used for 3DoF reproduction or acoustic zoom. But, to the inventors' knowledge, no method for interactive, fully 6DoF reproduction from such data has been proposed so far. One realizes the 6DoF reproduction by integrating information about the distance of the sound sources in the recording. This distance information is incorporated into the parametric representation of DirAC, such that the changed perspective of the listener is correctly mapped.

None of the Ambisonics sound field representations (be it as regular FOA or HOA Ambisonics or as DirAC-style parametric sound field representation) provide sufficient information to allow a translational shift of the listener's position as it is used for 6DoF applications since neither object distance nor absolute object positions in the sound scene are determined in these formats. It should be noted that the shift in the listener's position can be translated into an equivalent shift of the sound scene in the opposite direction.

A typical problem when moving in 6DoF is illustrated in FIG. 1b. Let us assume that the sound scene is described at Position A using Ambisonics. In this case sounds from Source A and Source B arrive from the same direction, i.e., they have the same direction-of-arrival (DOA). In case one moves to Position B the DOA of Source A and Source B are different. Using a standard Ambisonics description of the sound field, i.e., without additional information, it is not possible to compute the Ambisonics signals at Position B given the Ambisonics signals at Position A.

It is an object of the present invention to provide an enhanced sound field description on the one hand or a generation of a modified sound field description on the other hand that allow an improved or flexible or efficient processing.

SUMMARY

According to an embodiment, an apparatus for generating an enhanced sound field description may have: a sound field generator for generating at least one sound field description indicating a sound field with respect to at least one reference location; and a meta data generator for generating meta data relating to spatial information of the sound field, wherein the at least one sound field description and the meta data constitute the enhanced sound field description.

According to another embodiment, an apparatus for generating a modified sound field description from a sound field description and meta data relating to spatial information of the sound field description may have: a sound field calculator for calculating the modified sound field using the spatial information, the sound field description and a translation information indicating a translation of a reference location to a different reference location.

According to another embodiment, a method of generating an enhanced sound field description may have the steps of: generating at least one sound field description indicating a sound field with respect to at least one reference location; and generating meta data relating to spatial information of the sound field, wherein the at least one sound field description and the meta data constitute the enhanced sound field description.

According to still another embodiment, a method of generating a modified sound field description from a sound field description and meta data relating to spatial information of the sound field description may have the step of: calculating the modified sound field using the spatial information, the sound field description and a translation information indicating a translation from a reference location to a different reference location.

Another embodiment may have a non-transitory digital storage medium having stored thereon a computer program for performing a method of generating an enhanced sound field description having the steps of: generating at least one sound field description indicating a sound field with respect to at least one reference location; and generating meta data relating to spatial information of the sound field, wherein the at least one sound field description and the meta data constitute the enhanced sound field description, when said computer program is run by a computer.

Still another embodiment may have a non-transitory digital storage medium having stored thereon a computer program for performing a method of generating a modified sound field description from a sound field description and meta data relating to spatial information of the sound field description having the step of: calculating the modified sound field using the spatial information, the sound field description and a translation information indicating a translation from a reference location to a different reference location, when said computer program is run by a computer.

According to another embodiment, an enhanced sound field description may have: at least one sound field description indicating a sound field with respect to at least one reference location and meta data relating to spatial information of the sound field.

The present invention is based on the finding that typical sound field descriptions that are related to a reference location need additional information so that these sound field descriptions can be processed so that a modified sound field description that is not related to the original reference location but to another reference location can be calculated. To this end, meta data relating to spatial information of this sound field is generated and the meta data together with the sound field description corresponds to the enhanced sound field description that can, for example, be transmitted or stored. In order to generate a modified sound field description from the sound field description and the meta data and, specifically, the meta data relating to spatial information of the sound field description, the modified sound field is calculated using this spatial information, the sound field description and a translation information indicating a translation from a reference location to a different reference location. Thus, the enhanced sound field description consisting of a sound field description and meta data relating to spatial information of this sound field underlying the sound field description is processed to obtain a modified sound field description that is related to a different reference location defined by additional translation information that can, for example, be provided or used at a decoder-side.

However, the present invention is not only related to an encoder/decoder scenario, but can also be applied in an application where both, the generation of the enhanced sound field description and the generation of the modified sound field description take place on basically one and the same location. The modified sound field description may, for example, be a description of the modified sound field itself or actually the modified sound field in channel signals, binaural signals or, once again, a reference location-related sound field that, however, is now related to the new or different reference location rather than the original reference location. Such an application would, for example, be in a virtual reality scenario where a sound field description together with a meta data exists and where a listener moves out from the reference location to which the sound field is given and moves to a different reference location and where, then, the sound field for the listener moving around in the virtual area is calculated to correspond to the sound field but now at the different reference location where the user has moved to.

In an embodiment, the sound field generator may generate, for each layer of a plurality of at least two layers, a DirAC description of the sound field having one or more downmix signals and individual direction data and optionally diffuseness data for different time-frequency bins. In this context, the meta data generator is configured to generate additional distance or depth information for each layer, as the meta data being the same for all sources included in the layer and for all frequency bins related to the layer. The embodiment would have a distance or distance range associated to the layer. Alternatively, a depth map can be provided per layer. Particularly, and in further embodiment, the meta data relating to spatial information would be a depth map associating a certain distance to a certain position information such as a direction of arrival information.

In embodiments, the direction of arrival is given by only elevation or only azimuth or both angles and the depth map would then associate, to each source in a layer the same distance information such as a distance in meters or so or a relative distance or a quantized absolute or relative distance or any other distance information, from which, finally, a distance with respect to the different or new reference location, to which the sound field is related to can be derived.

Subsequently, other implementations are outlined.

Ambisonics has become one of the most commonly used formats for 3D audio in the context of virtual, augmented, and mixed reality applications. A wide variety of audio acquisition and production tools have been developed that generate an output signal in Ambisonics format. To present Ambisonics coded content in interactive virtual reality (VR) applications, the Ambisonics format is converted to a binaural signal or channels for reproduction. In the aforementioned applications, the listener is usually able to interactively change his/her orientation in the presented scene to the extent that he/she can rotate his/her head in the sound scene enabling three-degrees-of-freedom (3DoF, i.e., pitch, yaw, and role) and still experience an appropriate sound quality. This is implemented by rotating the sound scene before rendering according to the head orientation, which can be implemented with low computational complexity and is an advantage of the Ambisonics representation. In emerging applications, such as VR, it is however desired to allow the user free movement in the sound scene rather than only changes of orientation (so-called 'six-degrees-of-freedom' or 6DoF). As a consequence, signal processing is used to change the perspective of the sound scene (i.e. to virtually move within the sound scene along the x-, y-, or z-axes). However, a major disadvantage of Ambisonics is that the format describes the sound field from a single perspective in the sound scene. Specifically, it does not contain information about the actual location of sound sources in the sound scene which would allow to shift the sound scene ('translation') as it is used for 6DoF. This invention description provides several extensions of Ambisonics to overcome this problem and facilitate also the translation, and hence enable true 6DoF.

First-order Ambisonics (FOA) recordings can be processed and reproduced over headphones. They can be rotated to account for the listeners head orientation. However, virtual reality (VR) systems allow the listener to move in six-degrees-of-freedom (6DoF), i.e., three rotational plus three transitional degrees of freedom. Here, the apparent angles and distances of the sound sources depend on the listener's position. A technique to facilitate 6DoF is described. In particular, a FOA recording is described using a parametric model, which is modified based on the listener's position and information about the distances to the sources. The method is evaluated by a listening test, comparing different binaural renderings of a synthetic sound scene in which the listener can move freely.

In further embodiments, the enhanced sound field description is output by an output interface for generating an output signal for transmission or storage, where the output signal comprises, for a time frame, one or more audio signals derived from the sound field and the spatial information for the time frame. Particularly, the sound field generator is in further embodiments adaptive to derive direction data from the sound field, the direction data referring to a direction of arrival of sound for a time period or a frequency bin and the meta data generator is configured to derive the spatial information as data items associating a distance information to the direction data.

Particularly, in such an embodiment, an output interface is configured to generate the output signals so that the data items for the time frame are linked to the direction data for the different frequency bins.

In a further embodiment, the sound field generator is also configured to generate a diffuseness information for a plurality of frequency bins of a time frame of the sound field, wherein the meta data generator is configured to only generate a distance information for a frequency bin being different from a predetermined value, or being different from infinity or to generate a distance value for the frequency bin at all, when the diffuseness value is lower than a predetermined or adaptive threshold. Thus, for time/frequency bins that have a high diffuseness, any distance value is not generated at all or a predetermined distance value is generated that is interpreted by a decoder in a certain way. Thus, it is made sure that for time/frequency bins having a high diffuseness, any distance-related rendering is not performed, since a high diffuseness indicates that, for such a time/frequency bin, the sound does not come from a certain localized source but comes from any direction and, therefore, is the same irrespective of whether the sound field is perceived at the original reference location or the different or new reference location.

With respect to the sound field calculator, embodiments comprise a translation interface for providing the translation information or rotation information indicating a rotation of an intended listener to the modified sound field, a meta data supplier for supplying the meta data to the sound field calculator and a sound field supplier for supplying the sound field description to the sound field calculator and, additionally, an output interface for outputting the modified sound field comprising the modified sound field description and modified meta data, the modified meta data being derived from the meta data using the translation information, or the output interface outputs a plurality of loudspeaker channels, each loudspeaker channel being related a predefined loudspeaker position, or the output interface outputs a binaural representation of the modified sound field.

In an embodiment, the sound field description comprises a plurality of sound field components. The plurality of sound field components comprise an omnidirectional component and at least one directional component. Such a sound field description is, for example, a first-order Ambisonics sound field description having an omnidirectional component and three directional components X, Y, Z or such a sound field is a higher-order Ambisonics description comprising the omnidirectional component, the three directional components with respect to the X, Y, and Z directions and, additionally, further directional components that relate to other directions than the X, Y, Z directions.

In an embodiment, the apparatus comprises an analyzer for analyzing the sound field components to derive, for different time or frequency bins, direction of arrival information. The apparatus additionally has a translation transformer for calculating modified DoA information per frequency or time bin using the DoA information and the meta data, where the meta data relate to a depth map associating a distance to a layer description, i.e., to all sources of a layer, for all frequency bins of a time frame. Hence, a quite simple "depth map" is sufficient for each layer. The depth map for a layer only uses at least a distance or distance range for this layer as in FIG. 4c.

Furthermore, the sound field calculator has a distance compensator for calculating the modified sound field using a distance compensation information depending on the distance provided from the meta data being the same for each frequency or time bin of a source from the layer, and from a new distance associated with the time or frequency bin, the new distance being related to the modified DoA information.

In an embodiment, the sound field calculator calculates a first vector pointing from the reference location to a sound source obtained by an analysis of the sound field. Furthermore, the sound field calculator calculates a second vector pointing from the different reference location to the sound source and this calculation is done using the first vector and the translation information, where the translation information defines a translation vector from the reference location to the different reference location. And, then, a distance from the different reference location to the sound source is calculated using the second vector.

Furthermore, the sound field calculator is configured to receive, in addition to the translation information, a rotation information indicating a rotation of the listener's head in one of the three rotation directions given by pitch, yaw and roll. The sound field calculator is then configured to perform the rotation transformation to rotate a modified direction of arrival data for a sound field using the rotation information, where the modified direction of arrival data is derived from a direction of arrival data obtained by a sound analysis of the sound field description and the translation information.

In an embodiment, the sound field calculator is configured to determine source signals from the sound field description and directions of the source signals related to the reference location by a sound analysis.

Then, new directions of the sound sources are calculated that are related to the different reference location and this is done using the meta data, and then distance information of the sound sources related to the different reference location is calculated and, then, the modified sound field is synthesized using the distance information and the new directions of the sound sources.

In an embodiment, a sound field synthesis is performed by panning the sound source signals to a direction given by the new direction information in relation to a reproduction setup, and a scaling of the sound source signals is done using the distance information before performing the panning operation or subsequent to performing the panning operation. The source signals might need to be associated to a new layer if the distance changes. Then, a scaling factor different from 1 is used, if a sound field description is generated. If, in the sense of a transcoder, a new multi-layer description is generated, then only a change from one layer to the other is sufficient to account for the distance change. The "panning" can be done as outlined in FIG. 4i for generating a new sound field description in the form of a field related to a specific location. However, for generating loudspeaker signals, panning using panning gains derived from the new DoA can be performed.

In a further embodiment, a sound field synthesis is performed by rotating the FOA or HOA sound source signals in a layer to a direction given by the new direction information in relation to a reproduction setup, a scaling of the sound source signals, and finally associating the sound source signal to a layer using the distance information. This may replace the "panning" as discussed.

In a further embodiment, a diffuse part of the sound source signal is added to a direct part of the sound source signal, the direct part being modified by the distance information before being added to the diffuse part.

In a further embodiment, a diffuse part of the sound source signal is added to a dedicated layer. The signals associated to this dedicated layer is rotated based on the new direction information in relation to a reproduction setup.

Particularly, it is of advantage to perform the sound source synthesis in a spectral representation where the new direction information is calculated for each frequency bin, where the distance information is calculated for each frequency bin, and where a direct synthesis for each frequency bin using the audio signal for the frequency bin is performed using an audio signal for the frequency bin, a panning gain for the frequency bin derived from the new direction information and a scaling factor for the frequency bin derived from the distance information for the frequency bin is performed.

Furthermore, a diffuse synthesis is performed using a diffuse audio signal derived from the audio signal from the frequency bin and using a diffuseness parameter derived by the signal analysis for the frequency bin and, then, the direct signal and the diffuse signal are combined to obtain a synthesized audio signal for the time or frequency bin and, then, a frequency-time conversion is performed using audio signals for other time/frequency bins to obtain a time domain synthesized audio signal as the modified sound field.

Therefore, in general, the sound field calculator is configured to synthesize, for each sound source, a sound field related to the different reference location by, for example, processing, for each source, a source signal using the new direction for the source signal to obtain a sound field description of the source signal related to the different/new reference location. Furthermore, the source signal is modified before processing the source signal or subsequent to processing the source signal using the direction information. And, finally, the sound field descriptions for the sources are added together to obtain the modified sound field related to the different reference location.

In a further embodiment, the sound field calculator performs, alternatively to a DirAC analysis or any other sound source analysis, a source separation algorithm. The source separation algorithm results, in the end, in sound source signals, for example, in the time domain or in the frequency domain. A diffuse signal is then calculated by subtracting the sound source signals from the original sound field so that the original sound field is decomposed into a diffuse signal and several sound source signals, where each sound source signal has associated therewith a certain direction.

In accordance with embodiments, the sound-field generator generates a first sound-field description with respect to the reference location where the first sound-field description comprises sound data only from sound sources located in the first sound-field description around the reference location and the sound-field generator additionally generates a second sound-field description with respect to the reference location where the second sound-field description has sound data only from second source located in a second volume around the reference location, the second volume being different from the first volume. Each volume comprises one and advantageously more than one sound source, but the metadata is configured to provide the spatial description of the first volume and/or the second volume which is then applicable to all sound sources within the volume. When, for example, the spatial description is a representative distance of the certain layer to the reference location, then this distance is used in the same way for all sources within the layer in order to determine, together with the corresponding direction of arrival estimate, the position of the source within the layer. However, the position in the layer is only determined, with respect to the reference position in a radial way, while the distance of each source in the same layer corresponds to the spatial description or, in the specific embodiment, the representative distance associated with this volume/layer. Hence, a very efficient and compact metadata representation is obtained that consists, typically, in a single value for an arbitrary number of sources within the layer and, additionally, is the same for all sub-bands of a sound signal. When, for example, a sound analysis of a layer sound-field is used, then the distance information would be the same for each sub-band.

It is to be noted here that each volume is represented by a layer and advantageously by a separate layer so that the volumes do not overlap.

Thus, the present invention related to the multi-layer sound-field description has a very compact side information on the one hand but, with respect to a single sound-field description, more overhead, since the complete sound-field description is provided for each layer. When, for example, a single layer is represented by B-format signals, then, for each layer, four sound components are used, i.e., the omni-directional component and the three directional components. When, therefore, the sound-field is represented by three layers, then, altogether, twelve sound components, i.e., four per layer are used when each layer is represented by first-order Ambisonics signals or B-format signals. Naturally, different sound-field descriptions can be used for different layers such a higher-order sound-field description for a layer having a higher number of sources compared to a sound-field description having a smaller number of components for a layer having a lower number of sources.

On the other hand, however, only a single geometrical information is used as metadata for each sound-field layer.

In embodiments, the volumes are spheres or spherical shells around the reference location while, typically, the lowest layer is a sphere around the reference location and a higher layer is a spherical shell extending around the first layer represented by a sphere.

However, a volume represented by a sound-field does not necessarily have to be a sphere. The volume can, alternatively, be a cube, a parallelepiped element or any other, typically three-dimensional geometric form. However, the present invention can also be applied in a two-dimensional situation, so that the volume is represented by an area and, typically, an infinitesimal small extension in the third dimension. Thus, the term "volume" does not only refer to a true three-dimensional volume but also refers to a two-dimensional case where the volume in the two-dimensional case is a plane with an infinitesimal small extension in the third direction. Hence, the "volume" in the two-dimensional case would be a circle around the reference point for the first layer and a circular ring about the first "volume" having higher representative radius than a representative radius of the first layer.

Furthermore, the apparatus for generating an enhanced sound-field description cannot only be configured as a kind of an encoder generating, from an original sound-field, two or more layered sound-field descriptions and associating with these sound-field descriptions the spatial descriptions of the first volume and/or the second volume. In other embodiments, the apparatus for generating an enhanced sound-field description can also be implemented as a transcoder receiving a layer description with metadata and generating a new layered description with new metadata. When, for example, the metadata for each layer is represented by a representative distance to the reference point, and when the transcoded enhanced sound-field description has layers with the same representative distances to the different (new) reference point, then the metadata for the enhanced sound-field generated by the transcoder will be the same as the original metadata, but the transcoder will generate a modified sound-field description for each layer where the new directions of the individual sources are accounted for and, where, additionally, a new distance of a sound source to the reference location is accounted for by moving a sound source from one layer to the other and, of course, by either attenuating or amplifying the sound source signal for the sound source. Particularly, an attenuation will be provided to the sound source signal, when the sound source moves from a lower layer to a higher layer or, alternatively, an amplification to the sound source signal is provided, when the sound source moves from a higher layer to a lower layer, i.e., closer to the new reference location.

Each sound-field description for each layer can be analyzed by any source separation technique that can, for example, be any full-band source separation technique that not only generates a source signal from the layer description but, additionally, determines a direction of arrival of this source. Alternatively, its sound-field description can be also analyzed by a DirAC analyzer performing a frequency-selected source separation so that, for each time/frequency bin, a source audio signal together with, typically, a diffuseness value is calculated.

However, when it comes to the calculation of the distance of a certain source to the new reference location, the distance information obtained from the metadata for each layer is the same for each source determined from a certain layer description. Thus, in a broadband analysis case, where, for example, two or more sources with different directions of arrival have been determined from a layer description, the distance information is the same for each source.

Alternatively, when the sound-field description for a layer is analyzed by a DirAC analyzer, then the distance information for each time/frequency bin will, once again, be the same, i.e., will be equal to the reference distance for the corresponding layer.

In case the present invention is applied as a decoder, i.e., where the sound-field calculator calculates the modified sound-field in the form of a, for example, full directional component representation such as an Ambisonics representation, the metadata is only used for scaling corresponding sound signals depending on the old/new distance to the reference location. Then, one might calculate, for each sound source of each layer, a certain Ambisonics representation and this Ambisonics representation is calculated using the new direction of arrival determined from the old direction of arrival information and the translation information from the old reference location to the new reference location and, then, each source signal would be scaled in order to account for the distance of the source from the earlier to the new reference location and, subsequent to a corresponding scaling, the individual Ambisonics representation of the sources could be superposed to each other to have a full Ambisonics representation of the sound-field. Thus, such a "decoder" would be configured to transform a layered representation into a single sound-field description with respect to the new reference location that can then be further processed such as converted into speaker signals or so.

Alternatively, the sound-field calculator could be configured to perform a loudspeaker representation for an intended real or virtual loudspeaker setup from each individual layer, for example, a DirAC synthesis of the sound-field description of a layer and, then, the individual loudspeaker signals from the different layers could be added together to finally form a loudspeaker representation that can then be rendered by this predetermined loudspeaker setup or that can even be converted into a binaural representation by a binaural renderer.

Therefore, the present invention can be used for generating a layered sound-field description with metadata with respect to a certain reference location or for generating a transcoded enhanced sound-field once again using a layered representation, but now with layers that are related to the new reference location, or the present invention can be applied for decoding the layered representation plus metadata into a certain sound-field description without metadata that is related to the new reference location.

BRIEF DESCRIPTION OF THE DRAWINGS

Embodiments of the present invention will be subsequently discussed with respect to the accompanying drawings, in which:

FIG. 12a illustrates a known DirAC analysis implementation; and

FIG. 12b illustrates a known DirAC synthesis implementation.

DETAILED DESCRIPTION OF THE INVENTION

To enable 6DoF applications for the mentioned Ambisonics/DirAC representations, these representations are extended in a way that provides the missing information for translational processing. It is noted that this extension could, e.g., 1) add the distance or positions of the objects to the existing scene representation, and/or 2) add information that would facilitate the process of separating the individual objects.

It is furthermore an objective of embodiments to preserve/re-use the structure of the existing (non-parametric or parametric) Ambisonics systems to provide backward compatibility with these representations/systems in the sense that
the extended representations can be converted into the existing non-extended ones (e.g. for rendering), and
allow re-use of existing software and hardware implementations when working with the extended representation.

In the following, several approaches are described, namely one limited (but very simple) approach and three different extended Ambisonics formats to enable 6DoF.

Instead of the regular Ambisonics representation, multiple Ambisonics signals (i.e., sets of multiple signals) are defined. Each Ambisonics signal corresponds to a specific distance range of the sound scene. The distance ranges may comprise uniform partitions (e.g., 0-1 meter, 1-2 meters, 2-3 meters, . . . ) or non-uniform partitions (e.g., 0-1 meter, 1-3 meters, more than 3 meters). Non-overlapping distance ranges may be statically defined or dynamic on response to the actual properties of the sound scene and are defined in the multi-layer Ambisonics format. Alternatively, overlapping distance ranges together with window functions can be defined. One of the layers could be allocated separately for diffuse/ambient sounds which do not require a precise distance description but are distributed in the whole sound scene.

Figure 4A:
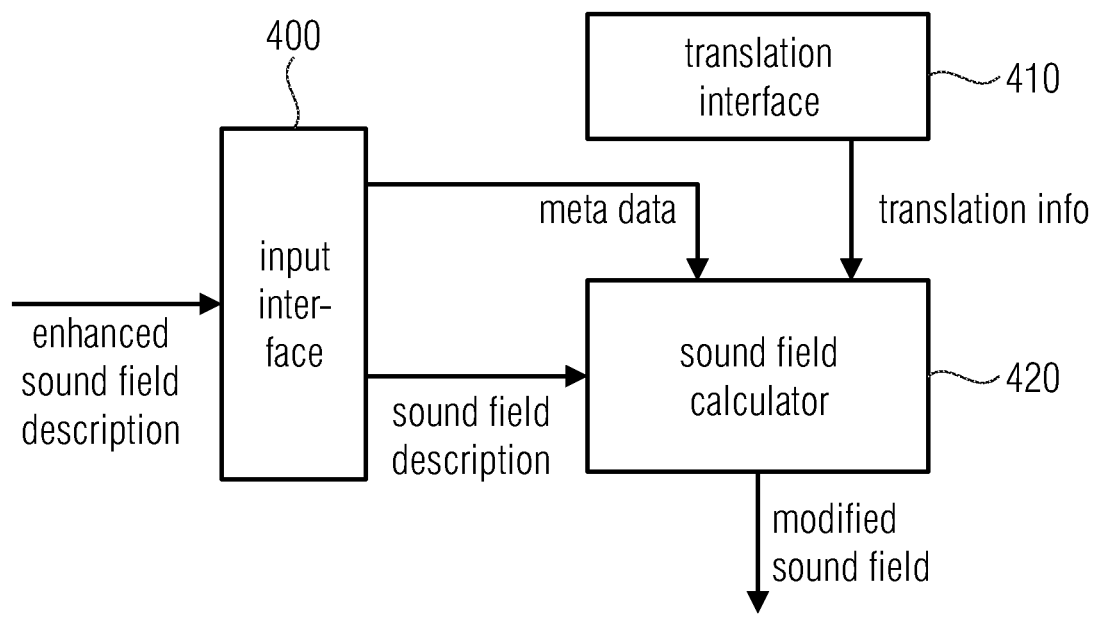
FIG. 4a illustrates an implementation of an apparatus of generating a modified sound field description.

The concept of multi-layer Ambisonics representation is applicable for both traditional and parametric (DirAC-style) Ambisonics. An example with three Layers is shown in FIG. 4c.

The following text describes how the proposed multi-layer Ambisonics can be used to implement translations.

Option I (FIG. 4d): Objects in each Ambisonics layer are generated by applying a source separation technique. An ambience/diffuse/residual Ambisonics signal can be generated as well. The DOA is obtained using 1D/2D source localization, and the distance is given by the metadata of the layer. Note that in many cases the DOA can be extracted also from the source separation filters, and that methods exist to perform joint source separation and DOA estimation.

Figure 4B:
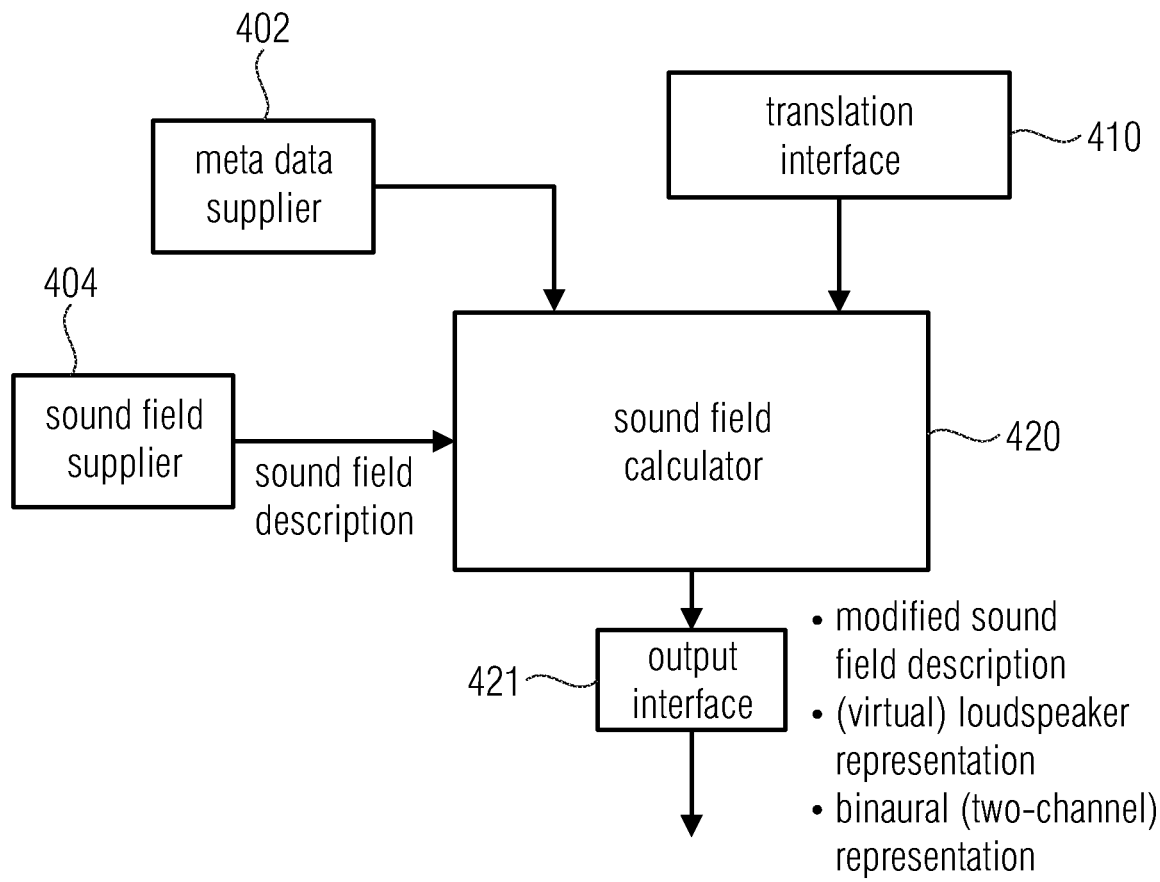
FIG. 4b illustrates a further implementation of an apparatus for generating a modified sound field description.
Figure 4C:
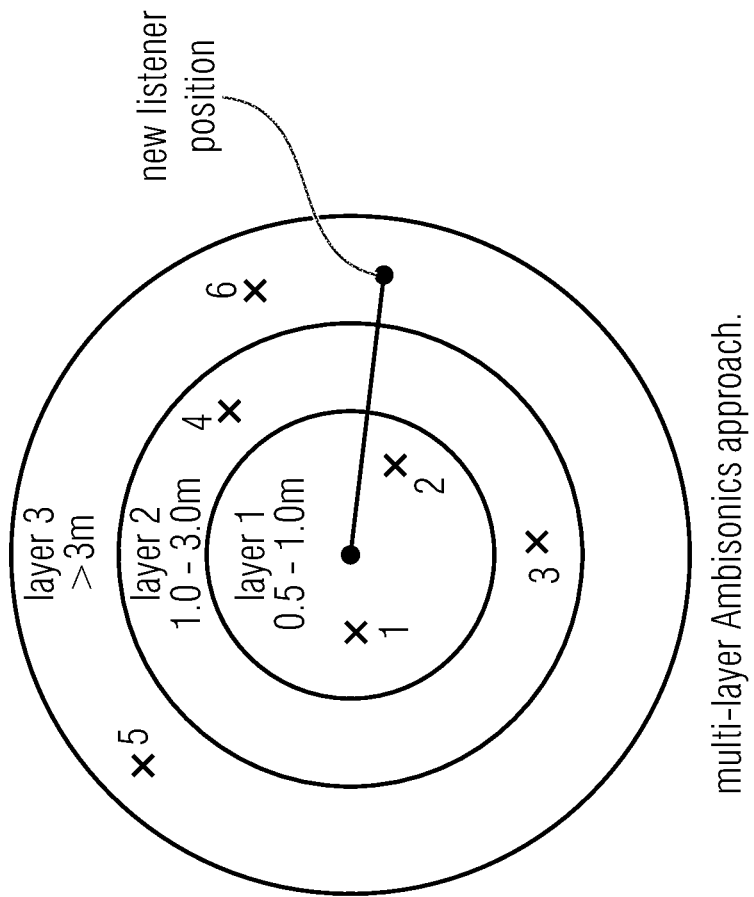
FIG. 4c illustrates a multi-layer scenario.
Figure 4D:
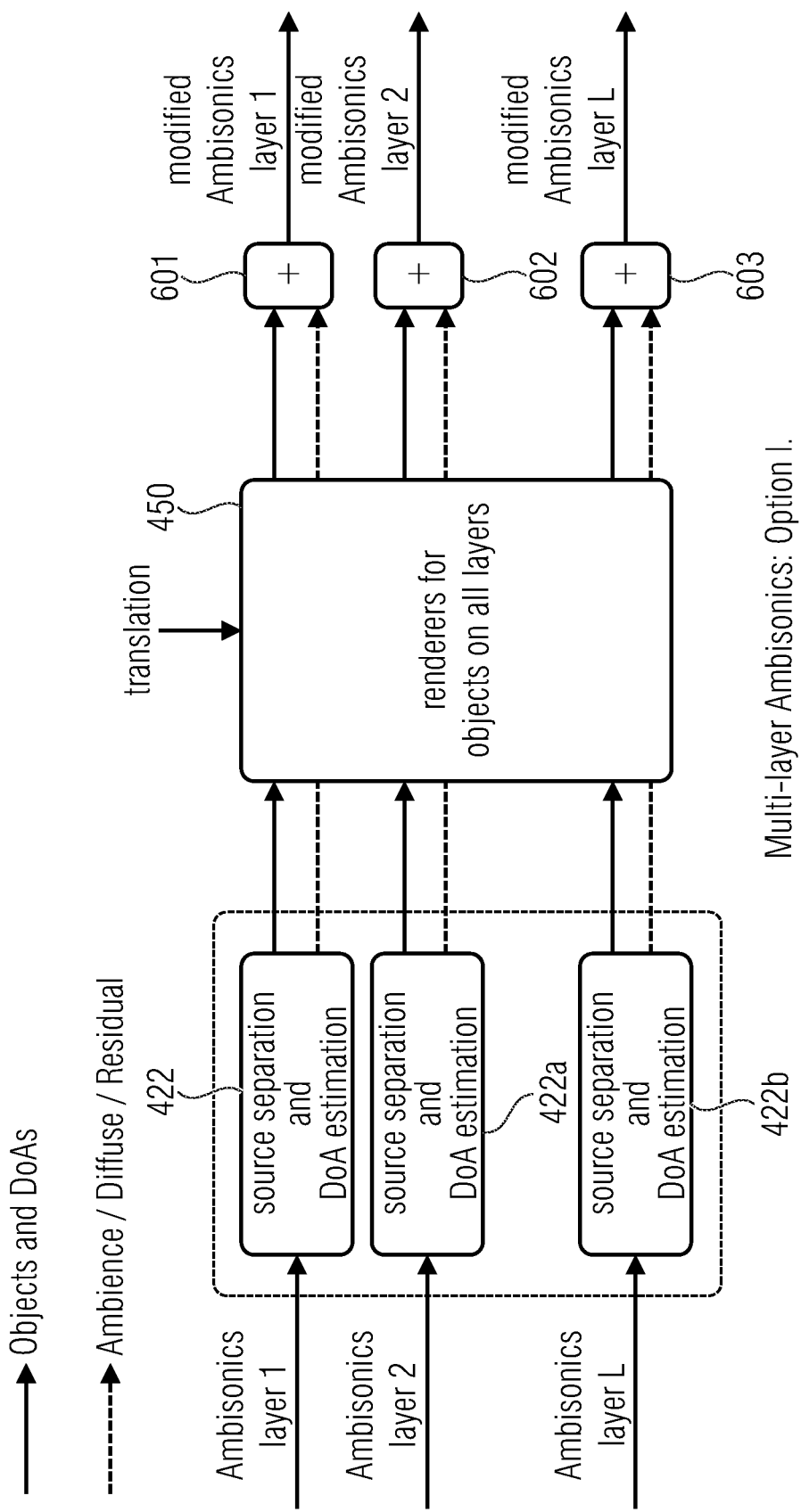
FIG. 4d illustrates an embodiment of a decoder or a transcoder option 1.
Figure 4E:
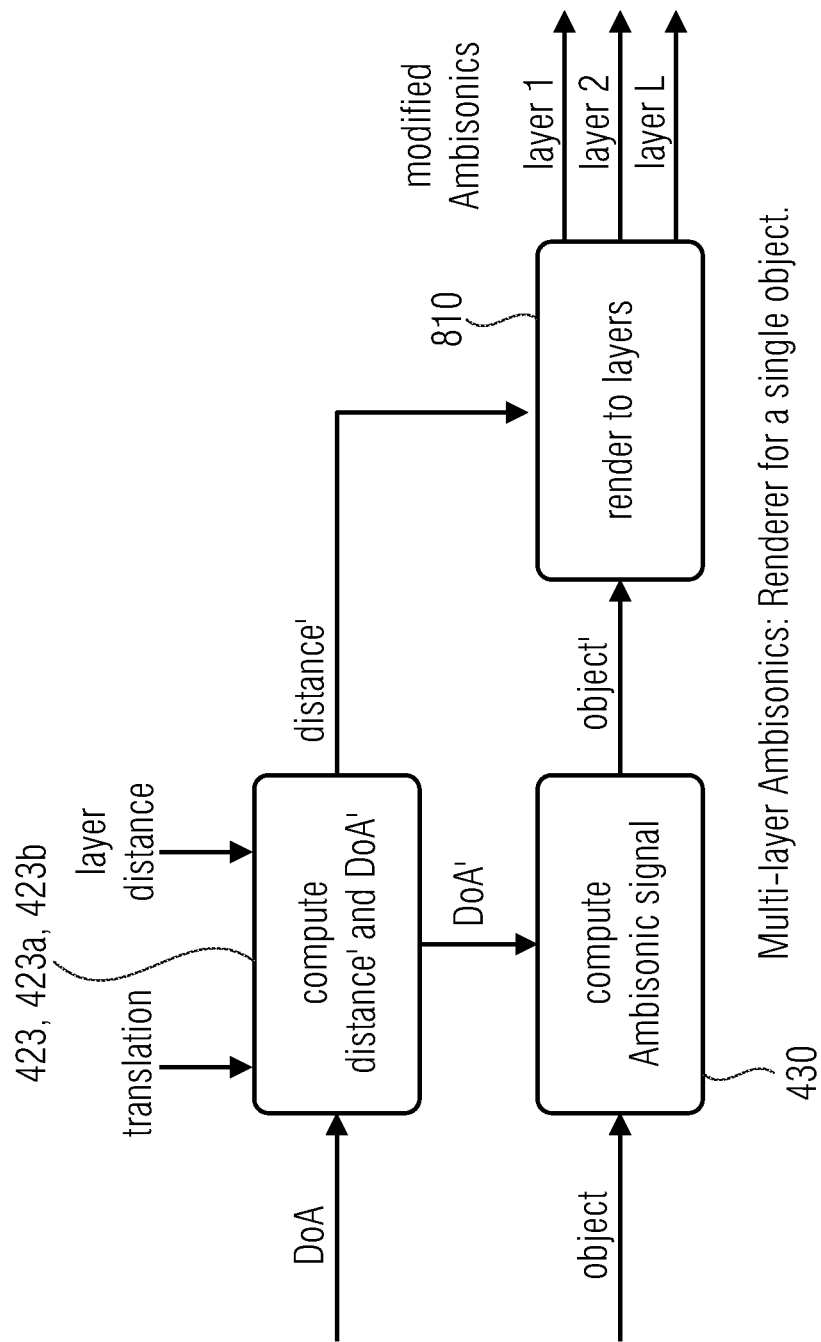
FIG. 4e illustrates a renderer for a single object.

Each singe-channel object is then rendered to one or more layers as shown in FIG. 4e. Firstly, the DOA and distance after the translation, represented respectively as DOA' and Distance', is computed based on the translation information (e.g., represented as a vector) and the layer distance (e.g., the average or representative distance of that layer). Secondly, an Ambisonics signal is generated for the object based on the DOA'. Thirdly, the object is rendered to the appropriate layer(s) based on the Distance' and the layer distance from which the object was extracted. After generating the modified Ambisonics signals for all objects, the i-th modified Ambisonics layer ($i \in \{1, \ldots, L\}$) is computed by adding together the modified Ambisonics output of Layer i of all objects. The ambience/diffuse/residual Ambisonics signal for the i-th layer is directly added to the i-th modified Ambisonics output.

Additionally, a so called distance-compensation filter can be applied to compensate for the change in distance. The filter can be applied directly to the object based on Distance' and the layer distance.

Option II (FIG. 4f): Objects are generated using all L layers by applying a source separation technique. A single ambience/diffuse/residual Ambisonics signal can be generated as well.

Each singe-channel object is then rendered to one or more layers as shown in FIG. 4e. Firstly, the DOA and distance after the translation, represented respectively as DOA' and Distance', is computed based on the translation information (e.g., represented as a vector) and the layer distance (e.g., the average or representative distance of that layer). Secondly, an Ambisonics signal is generated for the object based on the DOA'. Thirdly, the object is rendered to the appropriate layer(s) based on the Distance' and the layer distance from which the object was extracted. Additionally, a so called distance-compensation filter can be applied to each object to compensate for the change in distance. After generating the modified Ambisonics signals for all objects, the i-th modified Ambisonics layer ($i \in \{1, \ldots, L\}$) is computed by adding together the modified Ambisonics output of Layer i of all objects. The ambience/diffuse/residual Ambisonics signal for the i-th layer is directly added to the i-th modified Ambisonics output.

Additionally, a so called distance-compensation filter can be applied to compensate for the change in distance. The filter can be applied directly to the object based on Distance' and the layer distance.

Generating multi-layer Ambisonics signals is straightforward for computer-generated and produced content. It is less straightforward to convert natural recording via microphone arrays or spatial microphones (e.g., B-format microphone) to multi-layer Ambisonics signals.

The layers can be converted to a traditional Ambisonics signal by projecting, summing, or down-mixing. A simple and computationally efficient conversion is shown in FIG. 4g.

A change in orientation can be realized by applying a layer-independent rotation to each of the multi-layer Ambisonics signals or by applying a single rotation to the traditional Ambisonics signal. The layer-independent rotation can be performed before or after the translation.

Figure 1A:
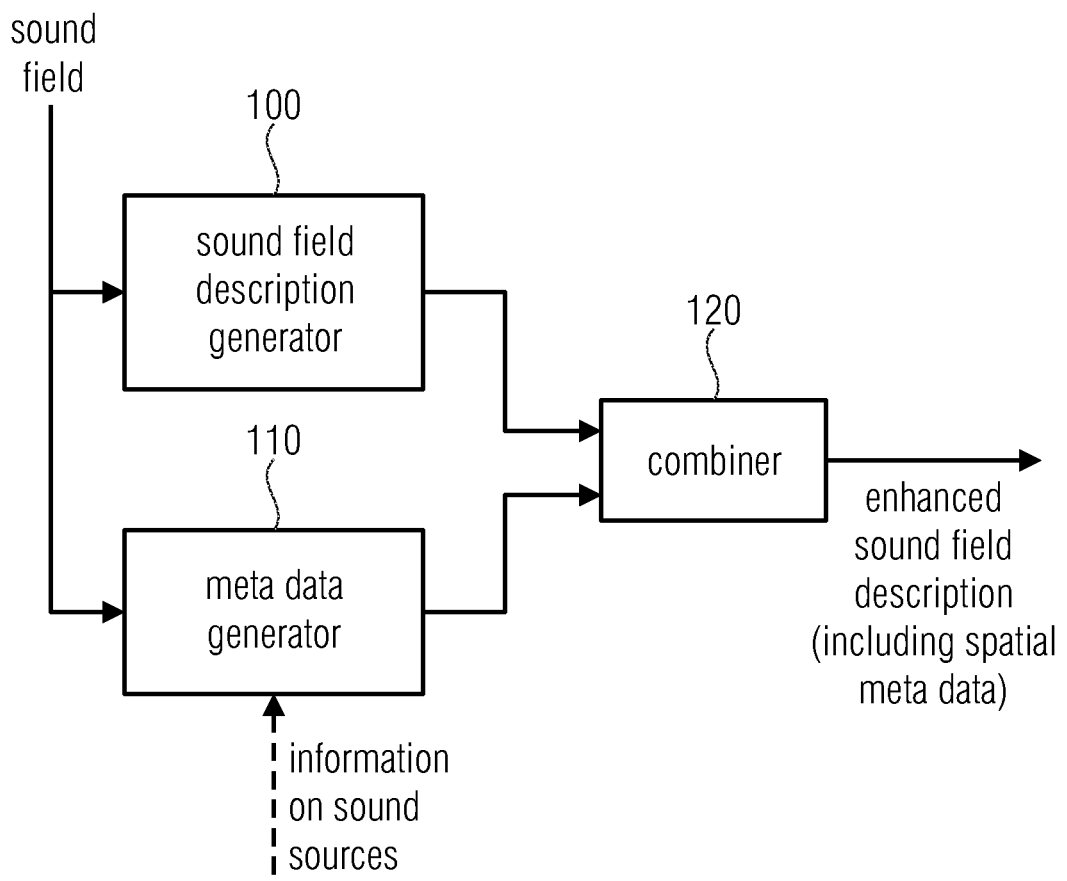
FIG. 1a is an embodiment of an apparatus for generating an enhanced sound field description.

FIG. 1a illustrates an apparatus for generating an enhanced sound field description comprising a sound field (description) generator 100 for generating at least one sound field description indicating a sound field with respect to at least one reference location. Furthermore, the apparatus comprises a meta data generator 110 for generating meta data relating to spatial information of the sound field. The meta data receives, as an input, the sound field or alternatively or additionally, separate information on sound sources.

Both, the output of the sound field description generator 100 and the meta data generator 110 constitute the enhanced sound field description. In an embodiment, both, the output of the sound field description generator 100 and the meta data generator 110 can be combined within a combiner 120 or output interface 120 to obtain the enhanced sound field description that includes the spatial meta data or spatial information of the sound field as generated by the meta data generator 110.

Figure 1B:
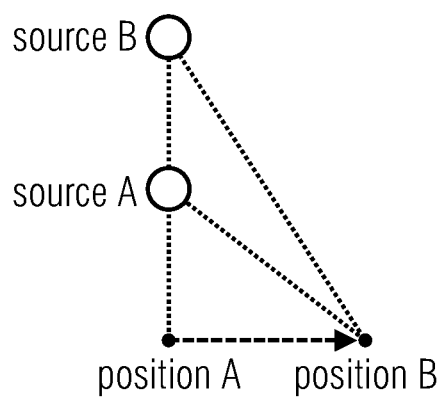
FIG. 1b is an illustration explaining an exemplary problem underlying the present invention.

FIG. 1b illustrates the situation that is addressed by the present invention. The position A, for example, is the at least one reference location and a sound field is generated by source A and source B and a certain actual or, for example, virtual microphone being located at the position A detects the sound from source A and source B. The sound is a superposition of the sound coming from the emitting sound sources. This represents the sound field description as generated by the sound field description generator.

Additionally, the meta data generator would, by certain implementations derive a spatial information with respect to source A and another spatial information with respect to source B such as the distances of these sources to the reference position such as position A.

Naturally, the reference position could, alternatively, be position B. Then, the actual or virtual microphone would be placed at position B and the sound field description would be a sound field, for example, represented by the first-order Ambisonics components or higher-order Ambisonics components or any other sound components having the potential to describe a sound field with respect to at least one reference location, i.e., position B.

The meta data generator might, then, generate, as the information on the sound sources, the distance of sound source A to position B or the distance of source B to position B. Alternative information on sound sources could, of course, be the absolute or relative position with respect to a reference position. The reference position could be the origin of a general coordinate system or could be located in a defined relation to the origin of a general coordinate system.

Other meta data could be the absolute position of one sound source and the relative position of another sound source with respect to the first sound source and so on.

Figure 2:
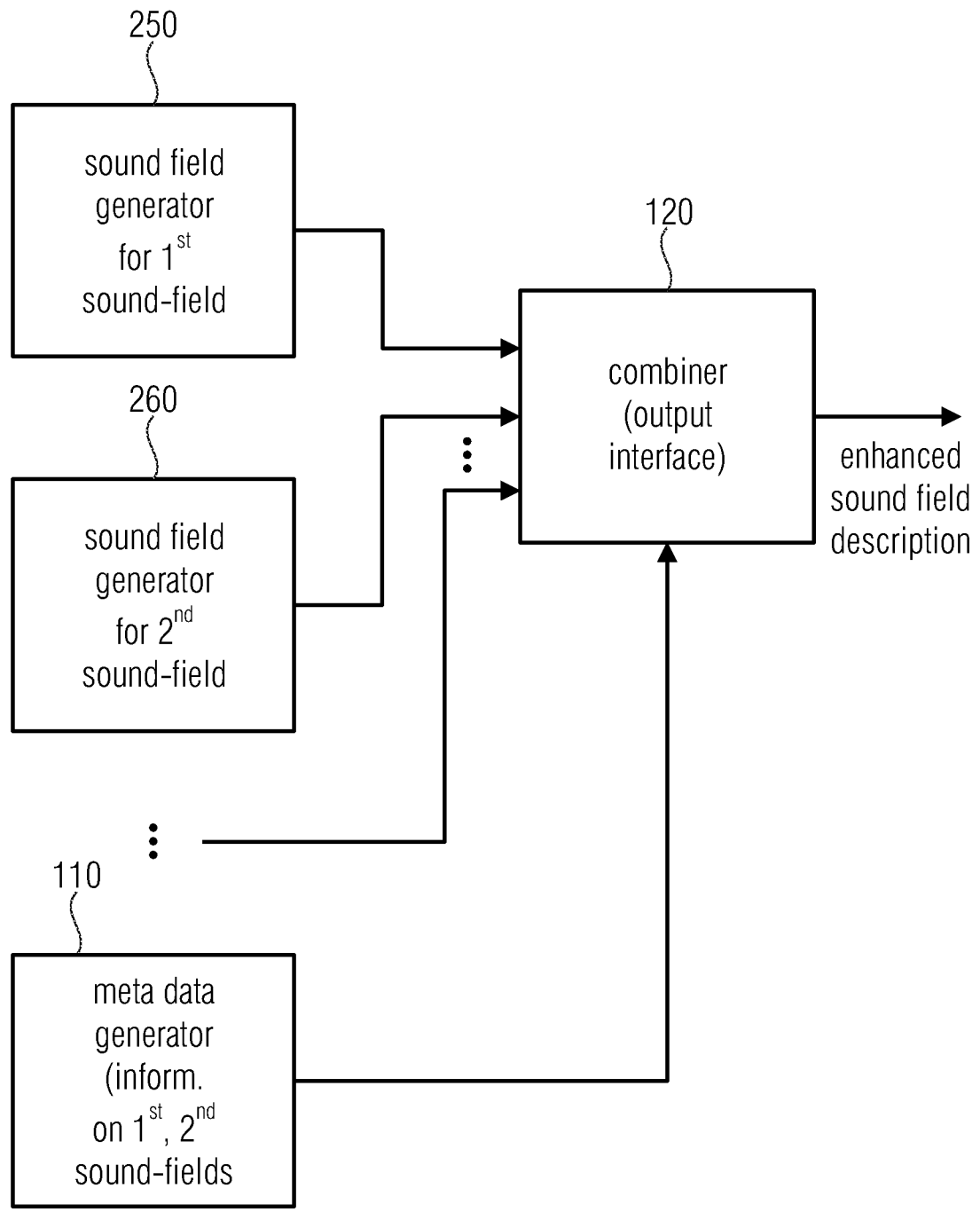
FIG. 2 is an implementation of the apparatus for generating an enhanced sound field description.

FIG. 2 illustrates an apparatus for generating an enhanced sound-field description, where the sound-field generator comprises a sound-field generator 250 for the first sound-field, a sound-field generator 260 for the second sound-field and, an arbitrary number of sound-field generators for one or more sound-fields such as a third, fourth and so on sound-field. Additionally, the metadata is configured to calculate and forward to the combiner 120 an information on the first sound-field and the second sound-field. All this information is used by the combiner 120 in order to generate the enhanced sound-field description. Thus, the combiner 120 is also configured as an output interface to generate the enhanced sound-field description.

Figure 3A:
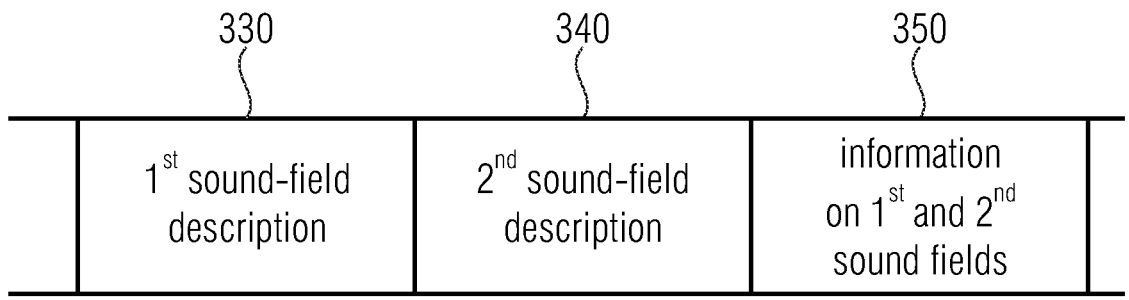
FIG. 3a illustrates the enhanced sound field description comprising audio data, and side information for audio data.

FIG. 3a illustrates an enhanced sound-field description as a data-stream comprising a first sound-field description 330, a second sound-field description 340 and, associated thereto, the metadata 350 comprising information on the first sound-field description and the second sound-field description. The first sound-field description can, for example, be a B-format description or a higher-order description or any other description that allows to determine a directional distribution of sound sources either in a full-band representation or in a frequency-selected representation. Thus, the first sound-field description 330 and the second sound-field description 340 can, for example, also be parametric sound-field descriptions for the individual layers having a, for example, downmix signal and directional of arrival data for different time/frequency bins.

Nevertheless, the geometrical information 350 for the first and the second sound-field descriptions is the same for all sources included in the first sound-field description 330 or, for the sources in the second sound-field description 340, respectively. Thus, when, exemplarily there does exist three sources in the first sound-field description 330 and a geometrical information on the first sound-field description then this geometrical information is the same for the three sources in the first sound-field description. Analogously, when there, for example, exists five sources in the second sound-field description, then the geometrical information for the second sound-field included in the metadata 350 is the same for all the sources in the seconds sound-field description.

Figure 3B:
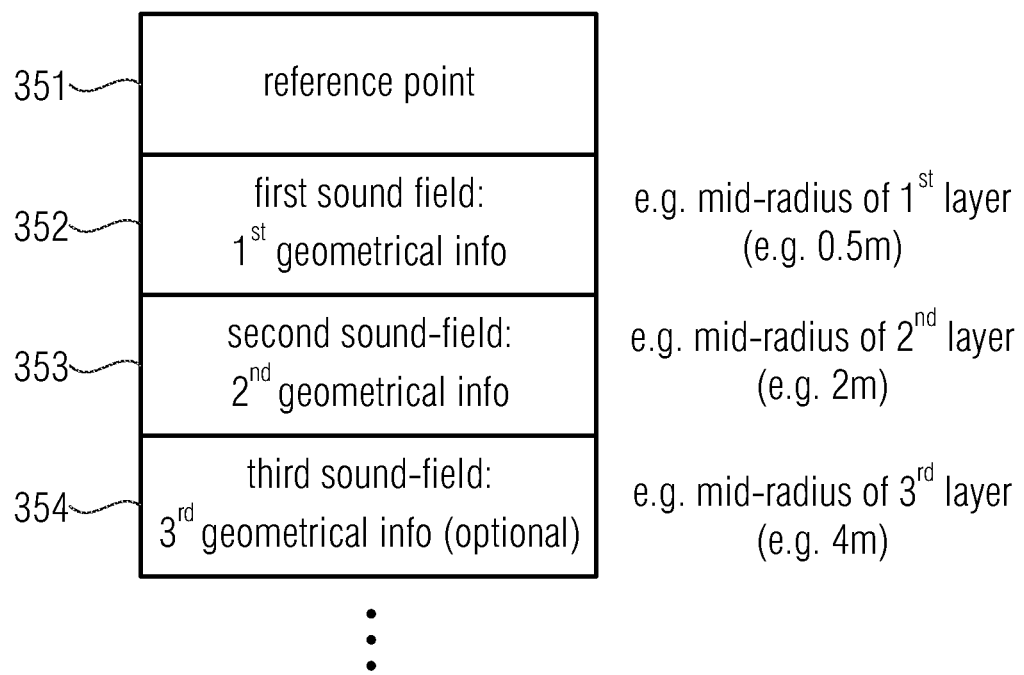
FIG. 3b illustrates a further illustration of an enhanced sound field comprising audio data and meta data relating to spatial information such as geometrical information for each layer description.

FIG. 3b illustrates an exemplary construction of the metadata 350 of FIG. 3a. In an embodiment, the reference point 351 can be included in the metadata. However, this is not necessarily the case in the reference point information 351 can also be omitted.

For the first sound-field, a first geometrical information is given which can, for example, be a mid-radius or a representative radius of the first layer which would, for example, be a value of 0.5 meters of the exemplary embodiment of FIG. 4c that will be described later.

The second sound-field is described by second geometrical information 353 that would, for example, correspond to the mid-radius of the second layer such as two meters for the FIG. 4c embodiment, since the second layer extends from one meter to three meters.

A third sound-field would be described by third geometrical information 354 and the representative distance would, for example, be a "mid-radius" of the third layer such as four meters or so. Naturally, each sound-field description may comprise more than one source, but the case can also be that a sound-field description of a certain layer only includes a single source.

When, for example, FIG. 4c is considered that illustrates an advantageous multi-layer Ambisonics approach, a first layer extends from 0 or a minimum distance, for example, 0.5 m to 1 m. The second layer extends from 1 m to 3 m and the third layer is comprising all sound sources that have a distance higher than 3 m from the first reference point being the center of the three circles illustrated in FIG. 4c.

Furthermore, FIG. 4c illustrates that the two sound sources 1, 2 are included in layer 1, the two sound sources 3, 4 are included in layer 2 and the sound sources 5 and 6 are included in layer 3.

As outlined, FIG. 3a illustrates an example of a bitstream or general data stream comprising the enhanced sound field description. The data stream may comprise time frames i, i+1 and so on and related side information for the corresponding time frame.

FIG. 4b illustrates another implementation where the sound field analyzer 210 in FIG. 2 does not actually generate a downmix, but generates a full representation in the B-format or A-format or any other such as higher-order representation for a certain time period.

FIG. 4c also illustrates a new listener position. When the same layers are drawn around the new listener position, it becomes clear that sound source 1 moves, due to the translation to the new listener position, from layer 1 to layer 3 and, therefore, has to be (strongly) attenuated.

Furthermore, sound source 2 moves from layer 1 to layer 2 and, therefore should also be (weakly) attenuated.

Furthermore, sound source 3 moves from earlier layer 2 into new layer 3 and, therefore, also has to be (weakly) attenuated.

Additionally, sound source 4 remains in the second layer and, therefore, does not require any attenuation. Furthermore, sound source 5 also remains in the same layer and, therefore, does not need to be scaled. Finally, sound source 6 is moved from the earlier third layer into the new first layer and, therefore, needs to be (strongly) amplified.

Therefore, in general, when a sound source moves, due to the translation from the reference point to the different (new) reference point, then a certain scaling factor is determined. When, the "moving" of the sound source goes from a higher layer to a lower layer, then the scaling is an attenuation and when the "moving" goes from the lower layer to the higher layer, than the scaling is an attenuation. Furthermore, when the "moving" goes from one layer to the next layer, then the scaling factor will be a weak scaling factor such a weak attenuation or a weak amplification and when the moving goes not from one layer to the next layer but from one layer to another layer that is not the adjacent layer to the one layer, i.e., from the first layer to the third layer or vice versa, then the scaling factor will be so that a stronger attenuation or amplification is performed.

When, for example a source moves from the third layer to the second layer, and when the exemplary values of FIG. 3*b* is considered, then the scaling factor will be in an amplification factor of 2.0, i.e., 4 m divided by 2 m. When, however, a sound source moves from the second layer to the third layer, then the scaling factor will 0.5, i.e., 2 m divided by 4 m.

When, alternatively, a sound source moves from the first layer to the third layer, and assuming the exemplary figures of FIG. 3*b*, then the scaling factor will be 0.1 to 5 obtained by dividing 0.5 m by 5 m.

When, alternatively, the sound source moves from the third sound-field to the first sound-field such as sound source 6 in the FIG. 4*c* embodiment, then the scaling factor will be 8.0 obtained by dividing 4 m by 0.5 m.

Naturally, although these examples have been described with respect to a two-dimensional "volume" case illustrated in FIG. 4*c*, the same considerations are also available for a true three-dimensional volume case when the circles in FIG. 4*c* are considered to represent a sphere for layer 1 and a spherical shell for layer 2 or layer 3.

FIG. 4*d* illustrates, in general, the implementation of the sound-field calculator for an apparatus for generating a modified sound-field description or, alternatively, for the apparatus for generating an enhanced sound-field description in the context of a transcoder representation. The first layer representation exemplarily illustrated as Ambisonics layer 1, the second sound-field description illustrated as Ambisonics layer 2 and an optional additional sound-field description illustrated at Ambisonics layer L are introduced into different source separation and DoA estimation blocks 422, 422*a*, 422*b*. Furthermore, a renderer 450 is used that is configured for rendering the objects found by the procedures in blocks 422, 422*a*, 422*b* to corresponding "new" layers. Furthermore, the analysis blocks 422, 422*a*, 422*b* are not only configured to extract the object signals and direction of arrivals for the object signals but are also configured to generate, from each layer sound-field description, an ambience/diffuse/residual signal. This signal can, for example, be obtained by subtracting a sum of all individual source signals derived by a source separation procedure from the individual representation. Alternatively, when the source separation 422, 422*a*, 422*b* is configured as a DirAC analysis, for example, then the diffuse/ambience/residual signal would be represented, in a parametric way, by diffuseness parameters.

Furthermore, FIG. 4*d* illustrates adder 601, 602, 603 for adding, to the modified Ambisonics representation of a certain layer, the corresponding diffuseness signal for the layer.

This is done for each of layer 1, layer 2, layer L and the output in FIG. 4*d* once again represents a transcoded enhanced sound-field description, since to the different modified representations output by block 601, 602, 603, certain metadata would be associated with indicating the representative distance of layer 1, layer 2 and layer L.

Figure 4F:
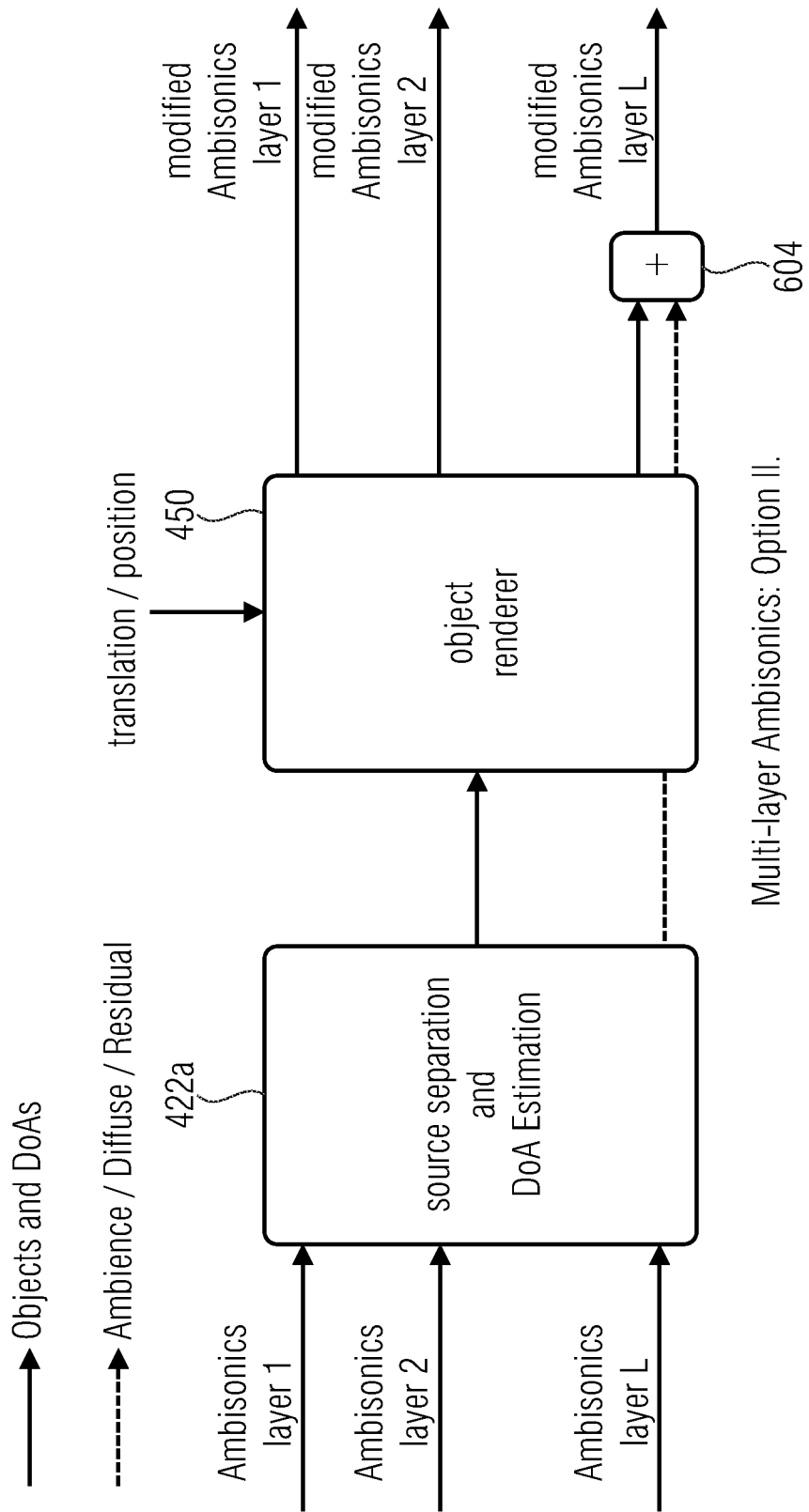
FIG. 4f illustrates an embodiment of a decoder or a transcoder option 2.
Figure 4G:
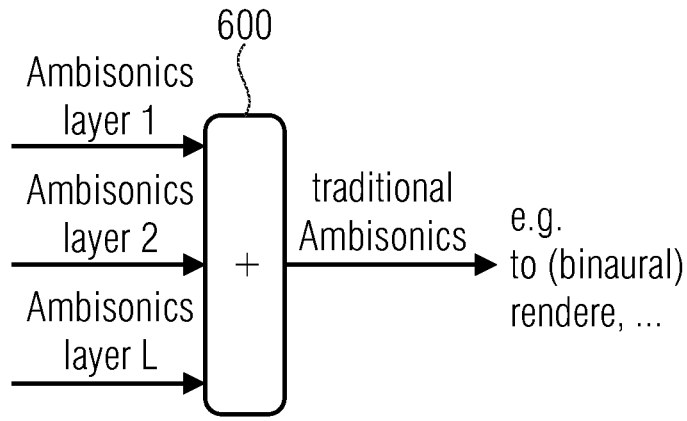
FIG. 4g illustrates a part of a decoder/renderer.

FIG. 4*e* illustrates, for the case in FIG. 4*d*, a renderer for a single object or source. The object is obtained, for example, by block 422 for the first layer or block 422*a* for the second layer or 422*b* for the L-th layer is input into block 430 for computing an Ambisonics signal, and block 430 can, for example, be configured as illustrated in FIG. 4*i*. For computing the Ambisonics signal, the new DoA', i.e., the direction of arrival value for a source as generate by block 423, 423*a*, 423*b* by the old DoA, the translation information from the original reference position to the new listener position.

Thus, a new Ambisonics signal for the object with respect to the new DoA' is calculated and output as object'. Thus, the output of block 430 of FIG. 4*i*, for example, would be the object' signal. Furthermore, block 423, 423*a*, 423*b* would calculate/determine the new distance as discussed before with respect to FIG. 4*c* and would, therefore, be for example calculating scaling factors as discussed before with respect to FIG. 4*c* and the example in FIG. 4*b* and, then, a render to layers block 810 could be configured to scale the object' signal obtained from block 430 with a certain scaling factor derived from the old distance (layer distance) and the new distance and, then, all signals belonging to a certain layer 1, 2 or L around the new listener position of FIG. 4*c* could be correspondingly added together to once again have a layered representation. Thus, with respect to the FIG. 4*c* embodiment, the only source now being in layer 1 would be original source 6, while original sources 5, 3, 1 would be added together with respect to their Ambisonics representations subsequent to the scaling as determined individually for each source to obtain the layer 3 signal when L=3 and, analogously, the source signal for sources 2, 4 would not represent the layer 2 signal where as illustrated in the table in FIG. 4*c*, source 4 requires no scaling, but source 2 uses a scaling operation.

Figure 4H:
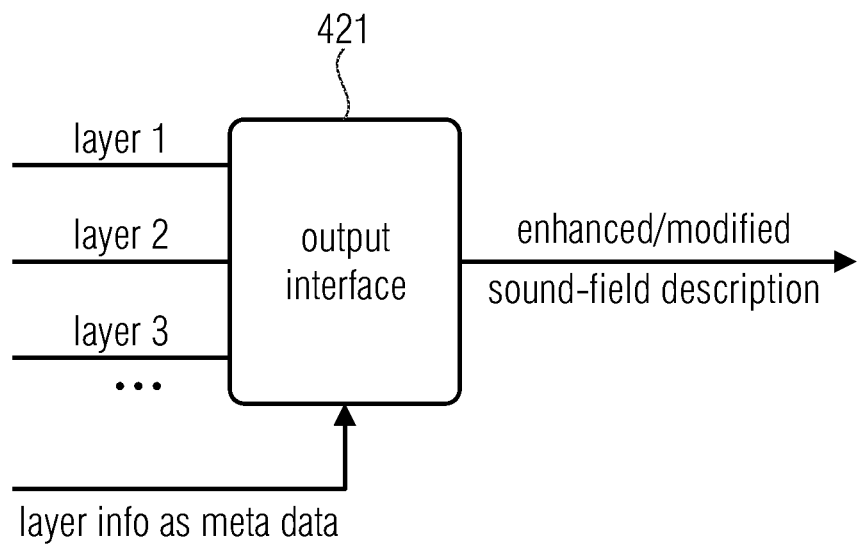
FIG. 4h illustrates a part of a transcoder.
Figure 4I:
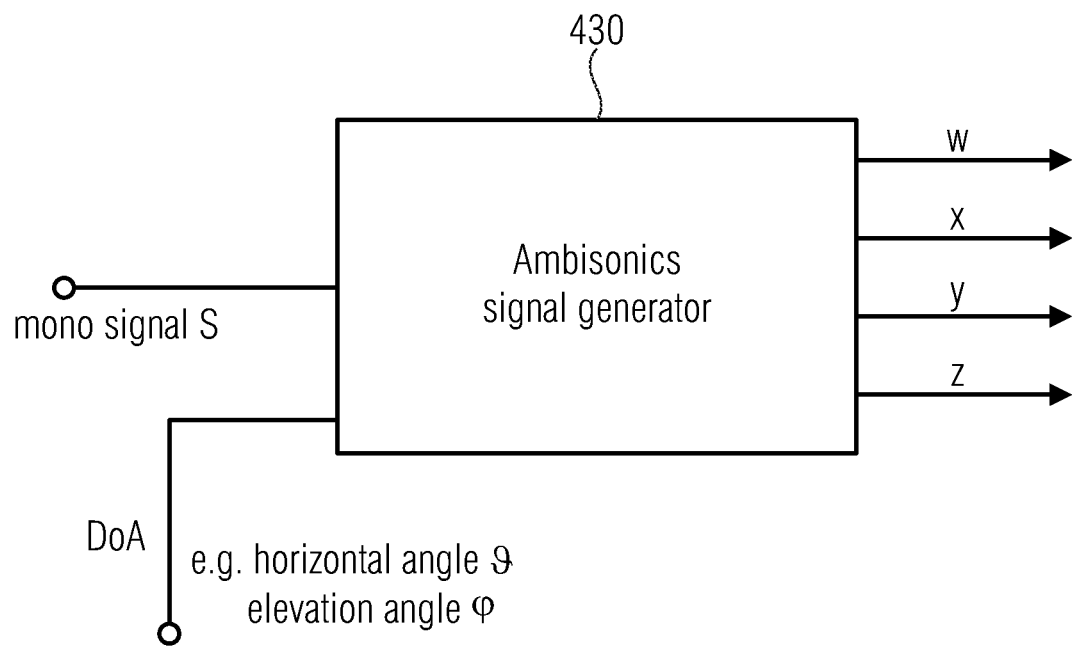
FIG. 4i illustrates an exemplary device for generating a sound field description from an audio signal such as a mono-signal and directional of arrival data.

Thus, FIG. 4*e* illustrates how the objects are determined for each layer and subsequent to adding the ambience/diffuse/residual signal by adder 601, 602, 603, the full modified Ambisonics representation for each layer is obtained and, this can then be output as the enhanced/modified sound-field description together with associated metadata as illustrated by FIG. 4*h*.

However, alternatively, the Ambisonics representation for each layer can simply be added together by an adder 600 illustrated in FIG. 4*g* in order to convert the multi-layer Ambisonics representation to the traditional Ambisonics representation that can then be traditionally rendered to an actual or loudspeaker representation to a binaural representation.

The other option II illustrated in FIG. 4*f* is different from FIG. 4*e* that only a single ambience/diffuseness/residual signal is generated from all individual layers, and this single ambience/diffuse/residual signal is only added by adders 604 to the highest layer. The source separation and DoA estimation 422*c* can, for example, be performed to each sound-field description for each layer individually for each layer as in FIG. 4*d*. However, the source separation and DoA estimation algorithm could also be implemented to add together all individual layer descriptions and to then obtain a signal layer description and to then perform the source separation and DoA estimation onto this single Ambisonics representation.

However, it is of advantage to proceed individually for each layer and, in order to generate the single diffuse signal, the individual diffuse signals obtained by the embodiment of FIG. 4d could be added together within block 422c.

Thus, option II may result in completely dry Ambisonics representations for lower layers and only in a "wet" representation for the highest layer, single diffuse signal is only added to the highest layer. Naturally, this procedure is useful, since the diffuseness signals is anyway not scaled by a distance procedure, but is used in the same way as it has been originally determined irrespective of whether the sound-field description is related to an original reference location or a new reference location corresponding, for example, to the listener position of FIG. 4c.

Figure 6:
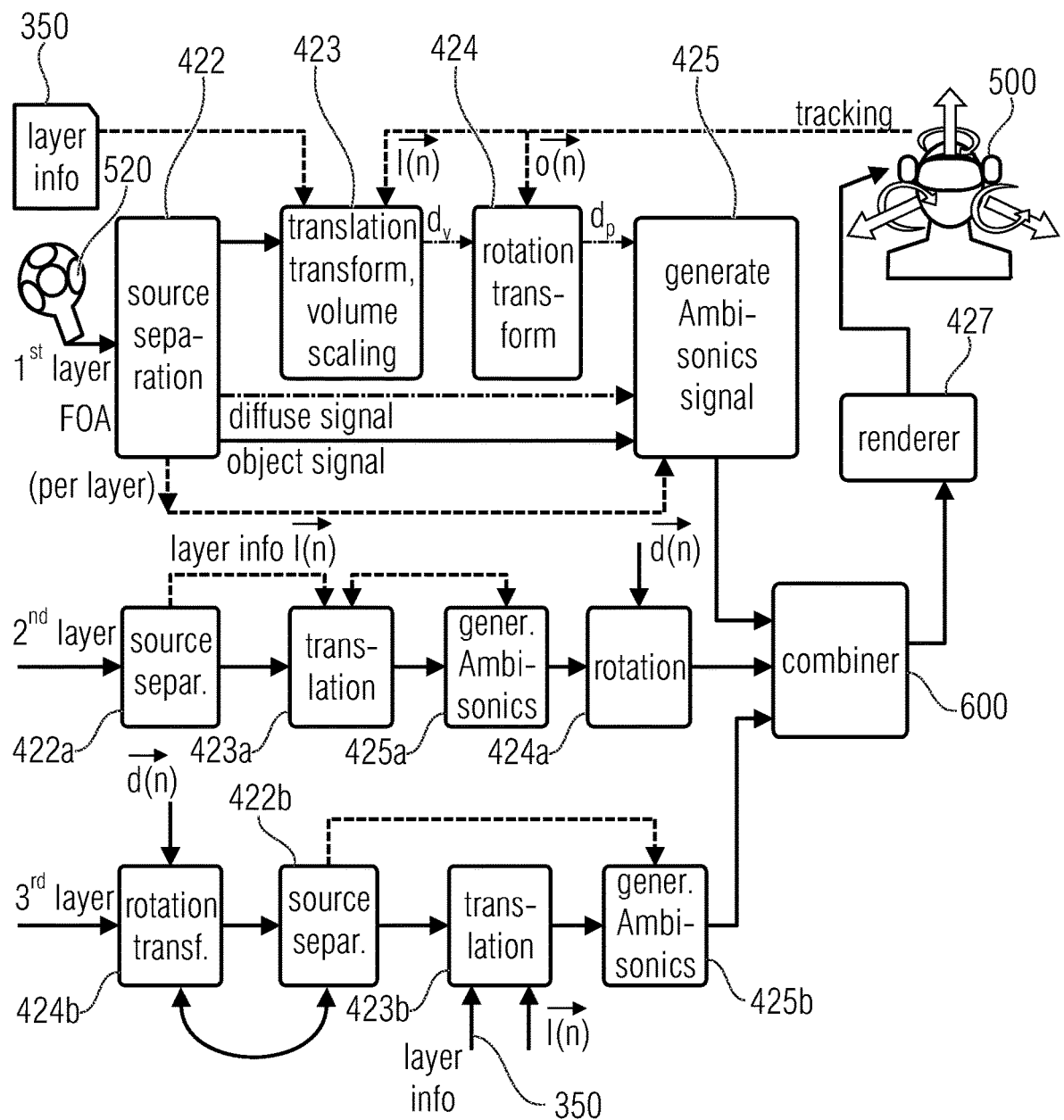
FIG. 6 illustrates an embodiment of a sixth DoF reproduction comprising an apparatus for generating an enhanced sound field description and an apparatus for generating a modified sound field description per layer.

FIG. 6 illustrates a source separation algorithm for each layer that can, for example, be configured as DirAC analysis. Then, the diffuse signal illustrated in FIG. 6 output by block 422 would not be there, but this diffuse signal would be represented by the diffuseness parameter, i.e., would be parametrically represented. Correspondingly, the object signal would be, for the DirAC procedure, the pressure signal per time/frequency bin. However, in a general case, the object signal can also be a full-band signal.

The first layer is represented by the upper branch, the second layer is represented by the branch in the middle of FIG. 6 and the third layer is represented by the branch at the bottom of FIG. 6.

In the case of a general source separation procedure, the corresponding synthesizer 425 would generate an Ambisonics signal for each layer as, for example, illustrated in FIG. 4d or 4f. Then, all these Ambisonics signals could be combined as generally discussed with respect of FIG. 4g, and, then, the signal could be rendered by renderer 427, for example, in a binaural case, when the signal is sent to a headphone applied to a head of a listener in the virtual reality environment illustrated at 500 in FIG. 6.

FIG. 6 additionally points to the fact that the procedures of source separation, translation, the generation of Ambisonics signals or rotation can be applied in many different orders.

While FIG. 6, upper layer illustrates that the source separation is performed before the rotation transform and also before the translation transform/volume scaling, the medium branch in FIG. 6 states that the source separation 533a is performed before the translation 423a and the generation of the Ambisonics signals is performed by block 425a but, then, subsequent to this step, the rotation transformation is applied in block 422a.

Again, the lower branch in FIG. 6 illustrates that the rotation transform 424b can even be applied before the source separation 422b, but can also be applied subsequent to the source separation, since the movement of the head of a listener is, of course, the same for all sources of a layer and even for all sources of all layers. Furthermore, the translation transform 423b can also be performed before the generation of Ambisonics signals and even before the rotation transformation, but not before the source separation, since either translation uses the direction of arrival of each source.

In the case of Ambisonics signals at the input into the combiner 600, and when the output of the combiner 600 is, additionally, a traditional Ambisonics signal as, for example, discussed with respect to FIG. 4g, then the rotation transform could even be applied subsequent to block 600 and, then, the renderer 427 would have to render either directly into a binaural representation or directly into a loudspeaker representation or into a binaural representation via a virtual loudspeaker representation. A fully translation transformed and completely rotated sound-field description that, however, is not layered anymore but the layer "characteristics" are abandoned due to the combination in combiner 600.

In this context, it is also clear from FIG. 6 and FIG. 4e that, in case of not just transcoding the signal but in case of generating a single sound-field description, the "render to layers 810" discussed in the context of the table in FIG. 4c is not necessary in the way illustrated with respect to FIG. 4c. Since only a single sound-field is generated, it does not matter, whether a source moves from one layer to the other or so. Instead, only the scaling factors are used, but these scaling factors can be derived directly from the representative distances for the layers or from the old distance given by the layer information 350 and the new distance obtained by using the old distance, the DoA of the source and the translation information as discussed, for example, with respect to FIG. 7. Hence, whether a source changes or "moves" from one layer to the other is only an issue for a transcoder representation, but is not an issue in the case of FIG. 4g or FIG. 6.

FIG. 4a illustrates an implementation of an apparatus for generating a modified sound field description from a sound field description and meta data relating to spatial information of the sound field description. Particularly, the apparatus comprises a sound field calculator 420 that generates the modified sound field using meta data, the sound field description and translation information indicating a translation from a reference location to a different reference location.

When, for example, the sound field is given with respect to position A in FIG. 1b, then the different reference location could be position B and the translation information would, for example, be a vector indicating the translation of position A to position B. The sound field calculator 420 would then calculate the modified sound field as if it would be perceived by a listener being located at position B, and for this calculation, the sound field calculator has the sound field description related to position A and the translation information and, additionally, the meta data relating the spatial position of source A and source B.

In an embodiment, the sound field calculator 420 is connected to an input interface 400 for receiving the enhanced sound field description as, for example, discussed with respect to FIG. 1a or 2 and the input interface 400 then separates the sound field description on the one hand, i.e., what has been generated by block 100 of FIG. 1a or block 210 of FIG. 2. Furthermore, the input interface 400 separates the meta data from the enhanced sound field description, i.e., item 350 of FIG. 3a or optional 351 and 352 to 354 of FIG. 3b.

Furthermore, a translation interface 410 obtains the translation information and/or additional or separate rotation information from a listener. An implementation of the translation interface 410 can be a head-tracking unit that not only tracks the rotation of a head in a virtual reality environment, but also a translation of the head from one position, i.e., position A in FIG. 1b to another position, i.e., position B in FIG. 1b.

FIG. 4b illustrates another implementation similar to FIG. 1a, but not related to an encoder/decoder scenario, but related to a general scenario where the meta data supply indicated by a meta data supplier 402, the sound field supply indicated by a sound field supplier 404 are done without a certain input interface separating an encoded or enhanced sound field description, but are all done, for example, in an actual scenario existing, for example, in a virtual reality application. However, the present invention is not limited to virtual reality applications, but can also be implemented in any other applications, where the spatial audio processing of sound fields that are related to a reference location is useful in order to transform a sound field related to a first reference location to another sound field related to a different second reference location.

The sound field calculator 420 then generates the modified sound field description or, alternatively, generates a (virtual) loudspeaker representation or generates a binaural representation such as a two-channel representation for a headphone reproduction. Thus, the sound field calculator 420 can generate, as the modified sound field, a modified sound field description, being basically the same as the original sound field description, but now with respect to a new reference position. In an alternative embodiment, a virtual or actual loudspeaker representation can be generated for a predetermined loudspeaker setup such as 5.1 scheme or a loudspeaker setup having more loudspeakers and, particularly, having a three-dimensional arrangement of loudspeakers rather than only a two-dimensional arrangement, i.e., a loudspeaker arrangement having loudspeakers being elevated with respect to the user position. Other applications that are specifically useful for virtual reality applications are applications for binaural reproduction, i.e., for a headphone that can be applied to the virtual reality user's head.

Figure 9:
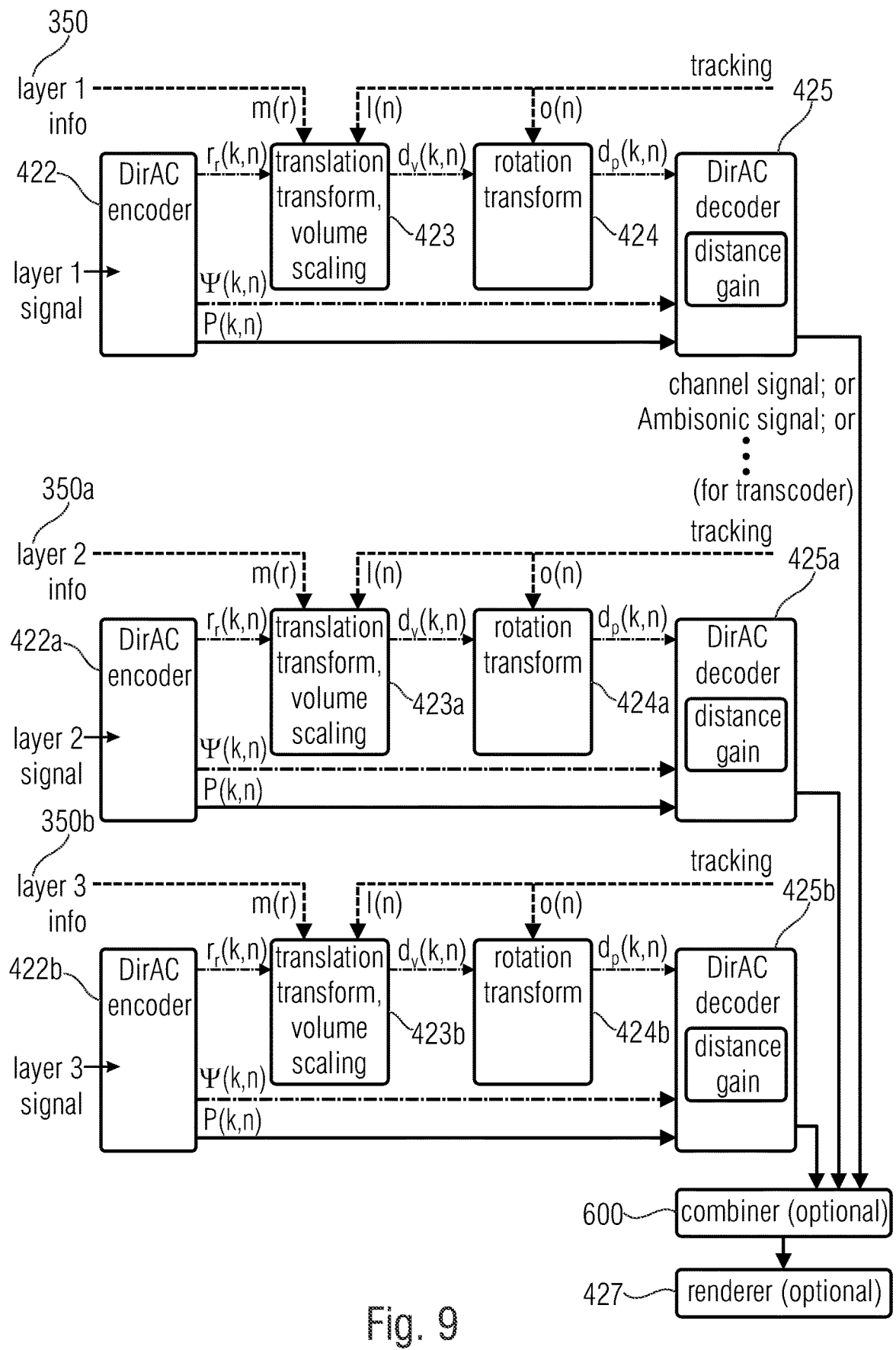
FIG. 9 illustrates another embodiment of a sixth DoF reproduction comprising an apparatus for generating an enhanced sound field description and an apparatus for generating a modified sound field description per layer in the context of DirAC per layer.

Exemplarily, the subsequently described FIG. 6 or FIG. 9 illustrate a situation, where a DirAC synthesizer only operates on a downmix component such as the omnidirectional or pressure component, while, in a further alternative embodiment illustrated with respect to FIG. 12b, the DirAC synthesizer operates on the whole sound field data, i.e., the full component representation having, in this embodiment in FIG. 12b, a field description with an omnidirectional component w and three directional components x, y, z.

FIG. 4i illustrates another implementation for performing a synthesis different from the DirAC synthesizer. When, for example, a sound field analyzer generates, for each source signal, a separate mono signal S and an original direction of arrival and when, depending on the translation information, a new direction of arrival is calculated, then the Ambisonics signal generator 430 of FIG. 4i, for example, would be used to generate a sound field description for the sound source signal, i.e., the mono signal S but for the new direction of arrival (DoA) data consisting of a horizontal angle θ or an elevation angle θ and an azimuth angle φ. Then, a procedure performed by the sound field calculator 420 of FIG. 4b would be to generate, for example, a first-order Ambisonics sound field representation for each sound source with the new direction of arrival and, then, a further modification per sound source could be performed using a scaling factor depending on the distance of the sound field to the new reference location and, then, all the sound fields from the individual sources could superposed to each other to finally obtain the modified sound field, once again, in, for example, an Ambisonics representation related to a certain new reference location.

When one interprets that each time/frequency bin processed by a DirAC analyzer 422, 422a, 422b of FIG. 6 or FIG. 9 represents a certain (bandwidth limited) sound source, then the Ambisonics signal generator 430 could be used, instead of the DirAC synthesizer 425, 425a, 425b to generate, for each time/frequency bin, a full Ambisonics representation using the downmix signal or pressure signal or omnidirectional component for this time/frequency bin as the "mono signal S" of FIG. 4i. Then, an individual frequency-time conversion in frequency-time converter for each of the W, X, Y, Z component would then result in a sound field description different from what is illustrated in FIG. 4c.

Further embodiments are outlined in the following. The goal is to obtain a virtual binaural signal at the listener's position given a signal at the original recording position and information about the distances of sound sources from the recording position. The physical sources are assumed to be separable by their angle towards the recording position.

The scene is recorded from the point of view (PoV) of the microphone, which position is used as the origin of the reference coordinate system. The scene has to be reproduced from the PoV of the listener, who is tracked in 6DoF, cf. FIG. 5. A single sound source is shown here for illustration, the relation holds for each time-frequency bin.

Figure 5:
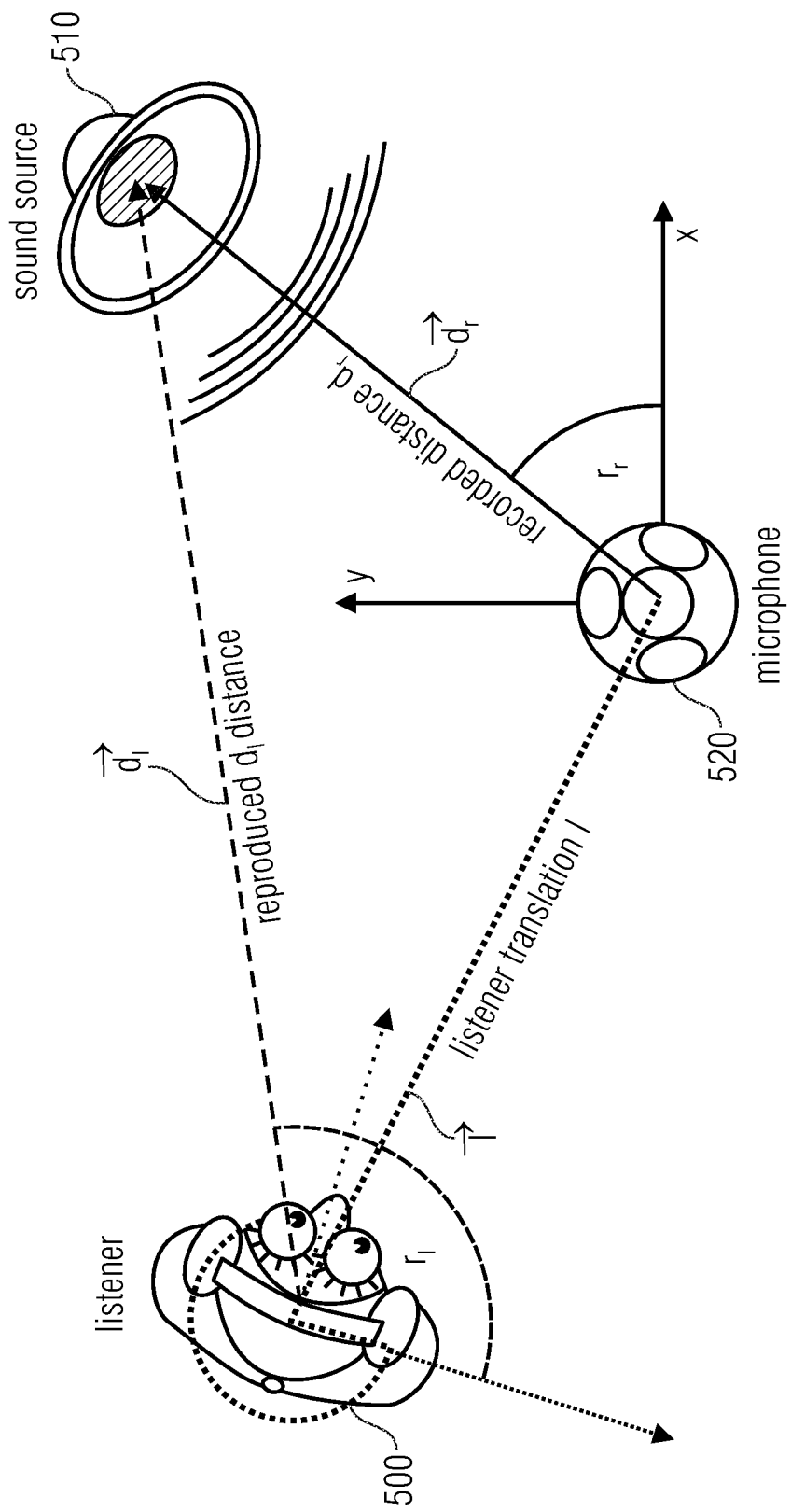
FIG. 5 illustrates the six DoF reproduction of spatial audio.

FIG. 5 illustrates the 6DoF reproduction of spatial audio. A sound source is recorded by a microphone with the DoA $r_r$ in the distance $d_r$ relative to the microphones position and orientation (black line and arc). It has to be reproduced relative to the moving listener with the DoA $r_l$ and distance $d_l$ (dashed). This has to consider the listeners translation l and rotation o (dotted).

The sound source at the coordinates $d_r \in \mathbb{R}^3$ is recorded from the direction of arrival (DoA) expressed by the unit vector $r_r = d_r / \|d_r\|$. This DoA can be estimated from analysis of the recording. It is coming from the distance $d_r = \|d_r\|$. It is assumed that this information is included in the meta data for each layer as the layer distance or, generally, as the item 352, 353, 354 of FIG. 3b, and can be represented as distance information in the form of a depth map m(l,r) mapping each source of a layer l having any direction r from the recording position to the distance (e.g. given in meters or so) of the layer from the reference point.

The listener is tracked in 6DoF. At a given time, he is at a position $l \in \mathbb{R}^3$ relative to the microphone and has a rotation $o \in \mathbb{R}^3$ relative to the microphones' coordinates system. The recording position is chosen as the origin of the coordinate system to simplify the notation.

Thus the sound has to be reproduced with a different distance $d_l$, leading to a changed volume, and a different DoA $r_l$ that is the result of both translation and subsequent rotation.

A method for obtaining a virtual signal from the listeners perspective by dedicated transformations based on a parametric representation, as explained in the following section, is outlined.

The proposed method is based on the basic DirAC approach for parametric spatial sound encoding cf. [16]. It is assumed that there is one dominant direct source per time-frequency instance of the analyzed spectrum and these can be treated independently. The recording is transformed into a time-frequency representation using short time Fourier transform (STFT). The time frame index is denoted with n and the frequency index with k. The transformed recording is then analyzed, estimating directions $r_r(k, n)$ and diffuseness $\psi(k, n)$ for each time-frequency bin of the complex spectrum P (k, n). In the synthesis, the signal is divided into a direct and diffuse part. Here, loudspeaker signals are computed by panning the direct part depending on the speaker positions and adding the diffuse part.

The method for transforming an FOA signal according to the listeners perspective in 6DoF can be divided into five steps, cf. FIG. 6.

FIG. 6 illustrates a method of 6DoF reproduction. The recorded FOA signal in B-Format is processed by a DirAC encoder that computes direction and diffuseness values for each time-frequency bin of the complex spectrum. The direction vector is then transformed by the listener's tracked position and according to the distance information given in a distance map for each layer. The resulting direction vector is then rotated according to the head rotation. Finally, signals for 8+4 virtual loudspeaker channels are synthesized in the DirAC decoder. These are then binauralized.

In the embodiment, the input signal is analyzed in the DirAC encoder 422, the distance information is added from the distance map m(l) giving a distance for each layer, then the listeners tracked translation and rotation are applied in the novel transforms 423 and 424. The DirAC decoder 425 synthesizes signals for 8+4 virtual loudspeakers, which are in turn binauralized 427 for headphone playback. Note that as the rotation of the sound scene after the translation is an independent operation, it could be alternatively applied in the binaural renderer. The only parameter transformed for 6DoF is the direction vector. By the model definition, the diffuse part is assumed to be isotropic and homogenous and thus is kept unchanged.

The input to the DirAC encoder is an FOA sound signal in B-format representation. It consists of four channels, i.e., the omnidirectional sound pressure and the three first-order spatial gradients, which under certain assumptions are proportional to the particle velocity. This signal is encoded in a parametric way, cf. [18]. The parameters are derived from the complex sound pressure P (k, n), which is the transformed omnidirectional signal and the complex particle velocity vector U(k, n)=[$U_X$ (k, n), $U_Y$ (k, n), $U_Z$ (k, n)]$^T$ corresponding to the transformed gradient signals.

The DirAC representation consists of the signal P (k, n), the diffuseness ψ (k, n) and direction r (k, n) of the sound wave at each time-frequency bin. To derive the latter, first, the active sound intensity vector $I_a$ (k, n) is computed as the real part (denoted by Re(•)) of the product of pressure vector with the complex conjugate (denoted by (•)*) of the velocity vector [18]:

$$I_a(k, n) = \frac{1}{2}\text{Re}(P(k, n)U*(k, n)). \quad (1)$$

The diffuseness is estimated from the coefficient of Variation of this vector [18]:

$$\psi(k, n) = \sqrt{1 - \frac{\|E\{I_a(k, n)\}\|}{E\{\|I_a(k, n)\|\}}} \quad (2)$$

where E denotes the expectation operator along time frames, implemented as moving average.

Since it is intended to manipulate the sound using a direction-based distance map having a distance for each source of a layer to the reference location, the variance of the direction estimates should be low. As the frames are typically short, this is not always the case. Therefore, a moving average is applied to obtain a smoothed direction estimate $\bar{I}_a$(k, n). The DoA of the direct part of the signal is then computed as unit length vector in the opposite direction:

$$r_r(k, n) = -\frac{\bar{I}_a(k, n)}{\|\bar{I}_a(k, n)\|} \quad (3)$$

As the direction is encoded as a three-dimensional vector of unit length for each time-frequency bin, it is straightforward to integrate the distance information. The direction vectors are multiplied with their corresponding map entry such that the vector length represents the distance of the corresponding sound source $d_r$(k, n):

$$d_r(k,n)=r_r(k,n)d_r(k,n)=r_r(k,n)m(l,r_r(k,n)) \quad (4)$$

where $d_r$ (k, n) is a vector pointing from the recording position of the microphone to the sound source active at time n and frequency bin k.

The listener position is given by the tracking system for the current processing frame as l(n). With the vector representation of source positions, one can subtract the tracking position vector l(n) to yield the new, translated direction vector $d_1$ (k, n) with the length $d_1$ (k, n)=$\|d_1$(k, n)$\|$, cf. FIG. 7. The distances from the listener's PoV to the sound sources are derived, and the DoAs are adapted in a single step:

$$d_1(k,n)=d_r(k,n)-l(n) \quad (5)$$

An important aspect of realistic reproduction is the distance attenuation. The attenuation is assumed to be a function of the distance between sound source and listener [19]. The length of the direction vectors is to encode the attenuation or amplification for reproduction. The distance to the recording position is encoded in $d_r$ (k, n) according to the distance map, and the distance to be reproduced encoded in $d_1$ (k, n). If one normalizes the vectors to unit length and then multiply by the ratio of old and new distance, one sees that the used length is given by dividing $d_1$ (k, n) by the length of the original vector:

$$d_V(k, n) = \frac{d_1(k, n)}{\|d_1(k, n)\|} \frac{\|d_1(k, n)\|}{\|d_r(k, n)\|} = \frac{d_1(k, n)}{\|d_r(k, n)\|} \quad (6)$$

The changes for the listener's orientation are applied in the following step. The orientation given by the tracking can be written as vector composed of the pitch, yaw, and roll o(n)=[$o_X$ (n), $o_Z$ (n), $o_Y$ (n)]$^T$ relative to the recording position as the origin. The source direction is rotated according to the listener orientation, which is implemented using 2D rotation matrices:

$$d_p(k,n)=R_Y(o_Y(n))R_Z(o_Z(n))R_X(o_X(n))d_v(k,n) \quad (7)$$

The resulting DoA for the listener is then given by the vector normalized to unit length:

$$r_p(k, n) = \frac{d_p(k, n)}{\|d_p(k, n)\|} \quad (8)$$

The transformed direction vector, the diffuseness, and the complex spectrum are used to synthesize signals for a uniformly distributed 8+4 virtual loudspeaker setup. Eight virtual speakers are located in 45° azimuth steps on the listener plane (elevation 0°), and four in a 90° cross formation above at 45° elevation. The synthesis is split into a direct and diffuse part for each loudspeaker channel 1≤i≤I, where I=12 is the number of loudspeakers [16]:

$$Y_i(k,n)=Y_{i,S}(k,n)+Y_{i,D}(k,n) \quad (9)$$

For the direct part, edge fading amplitude panning (EFAP) panning is applied to reproduce the sound from the right direction given the virtual loudspeaker geometry [20]. Given the DoA vector $r_p$ (k, n), this provides a panning gain $G_i$(r) for each virtual loudspeaker channel i. The distance-dependent gain for each DoA is derived from the resulting length of the direction vector, $d_p$ (k, n). The direct synthesis for channel i becomes:

$$Y_{i,S}(k,n) = \sqrt{1-\psi(k,n)} P(k,n)$$

$$G_i(r_p(k,n))(\|d_p(k,n)\|)^{-\gamma} \quad (10)$$

where the exponent $\gamma$ is a tuning factor that is typically set to about 1 [19]. Note that with $\gamma=0$ the distance-dependent gain is turned off.

The pressure P(k, n) is used to generate/decorrelated signals $\tilde{P}_i(k, n)$. These decorrelated signals are added to the individual loudspeaker channels as the diffuse component. This follows the standard method [16]:

$$Y_{i,D}(k, n) = \sqrt{\psi(k, n)} \frac{1}{\sqrt{I}} \tilde{P}_i(k, n) \quad (11)$$

The diffuse and direct part of each channel are added together, and the signals are transformed back into the time domain by an inverse STFT. These channel time domain signals are convolved with HRTFs for the left and right ear depending on the loudspeaker position to create binauralized signals.

Figure 8:
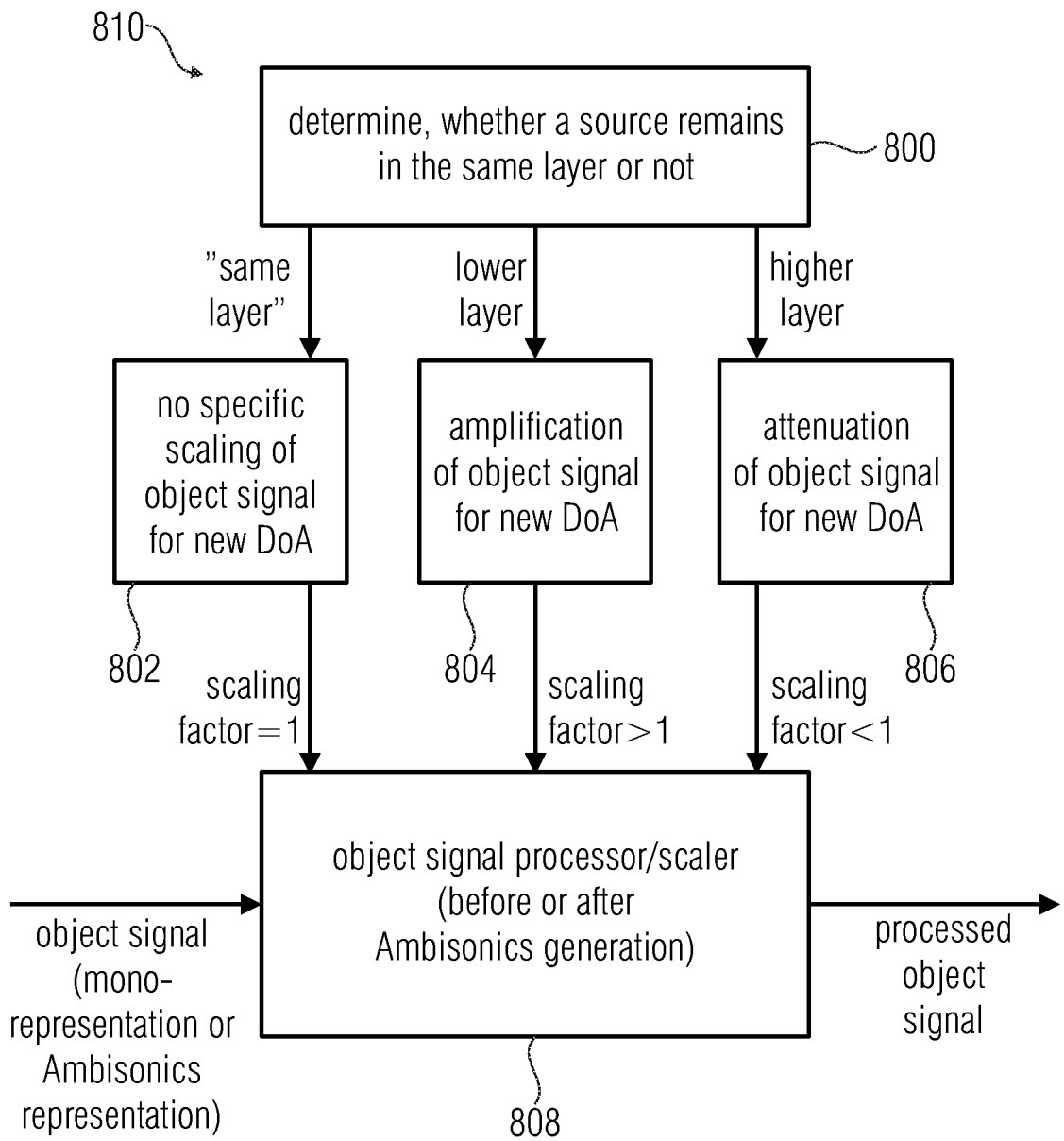
FIG. 8 illustrates an embodiment of a scaling factor determination and application.

FIG. 8 illustrates an implementation of a transcoder implementation that operates, for example, without representative distances, but with general determinations of scaling factors that are not derived from the distances of the layers but just from whether a source moves from a layer to another layer which is adjacent or not adjacent to the earlier layer. Thus, block 800 is configured to determine, whether a source remains in the same layer or not. If it is determined that the same layer is the result as, for example, for sources 4 and 5, then block 802 would determine that no specific scaling of the object signal for the new direction of arrival is used and a "scaling factor" indicating no scaling would be set to 1 or, alternatively, it could simply be flagged or notified in any way that for such a source any scaling is not to be performed.

When, however, it is determined that the source moves to a lower layer, then block 804 would determine a scaling factor being greater than 1. This determination can be done by using the representative distances of the two layers, i.e., the source layer and the target layer. However, it a certain scaling factor could also be used which is, for example, between 1 and 2 when the movement takes place from one layer to the adjacent layer and which is, for example, equal to 4 when the source moves by two layers and so on.

FIG. 8 furthermore illustrates a situation at block 806 where the source moves to a higher layer as, for example, source 1, 2, 3. Then, a scaling factor for this source would be determined which is lower than 1. Again, the scaling factor can be determined from the representative distance as has been discussed before but can also be, alternatively, obtained by using fixed scaling factors that depend on how many layers have been moved due to the translation from the original reference location to the new reference location or listener position. When, for example, a movement takes place by one layer only, then a moderate scaling factor such as between 0.5 and 1 could be used and when movement takes place by two or more layers, then a higher scaling factor between 0.1 and 0.5 could be used.

The object signal processor/scaling 808 would then apply a scaling either to the object signal before Ambisonics generation or would apply the scaling to all components of the Ambisonics representation to finally obtain the processed object signal either in a mono-representation per source or in an Ambisonics representation.

FIG. 9 illustrates a further embodiment, which is similar to FIG. 6, but where the individual blocks 422, 422a, 422b of, for example, FIG. 4d are implemented as DirAC encoder/decoder implementations. Then, the result could be individual loudspeaker channel signals or Ambisonics signals or any other signal representations, for example, for a transcoder. However, when the output are channel signals or even binaural signals, then those corresponding signals could be added together in combiner 600 to represent and single sound-field description that could then be rendered in block 427 by any further procedure.

Figure 10:
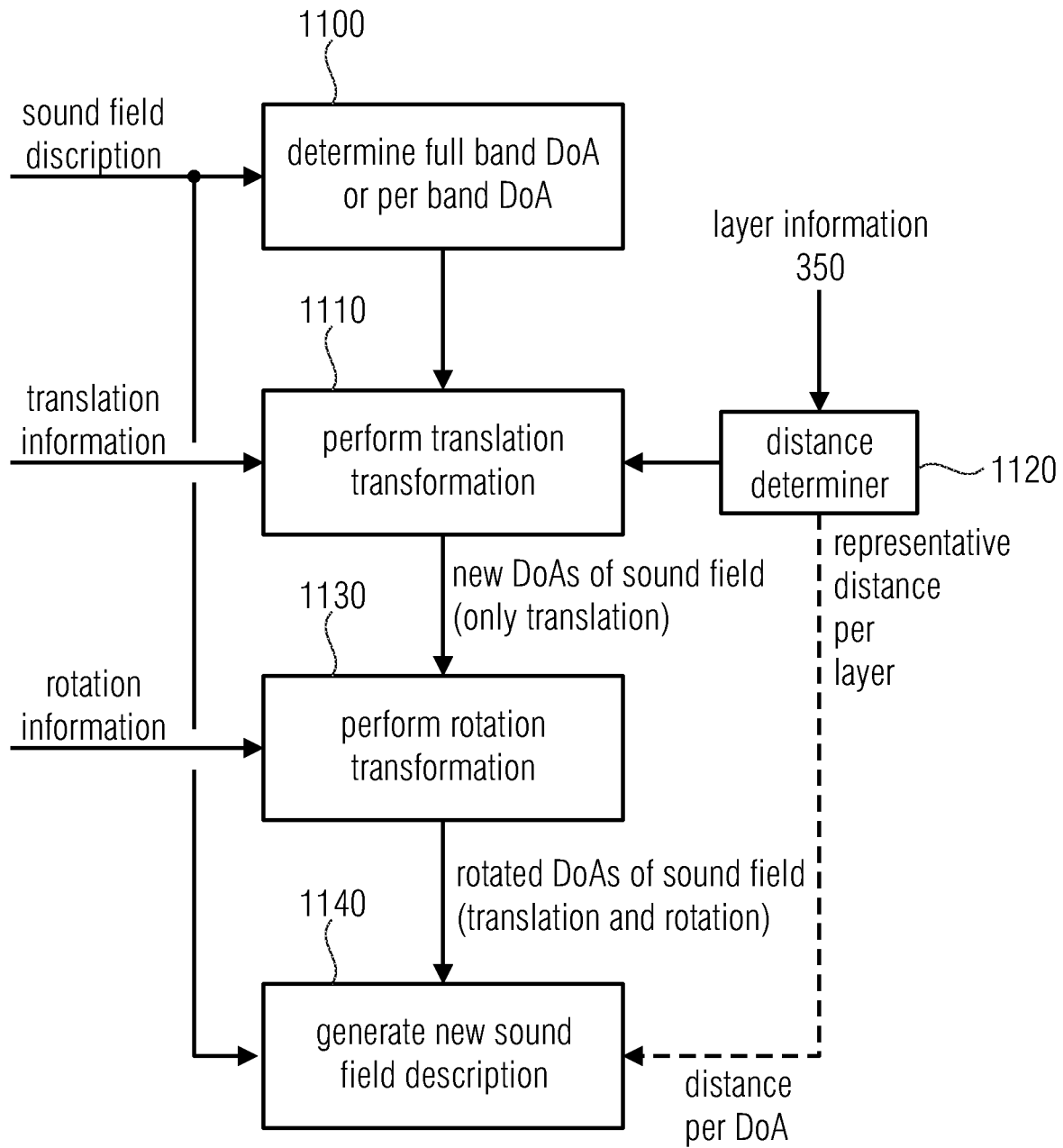
FIG. 10 illustrates an implementation of the apparatus for generating a modified sound field description.

FIG. 10 illustrates a further implementation of the sound field calculator 420. The procedure illustrated in FIG. 10 is performed for each layer separately. The only difference is that for each layer a different layer information 350 is used, and this layer information is the same for each source in the layer. The layer information is read from the meta data by the distance determiner 1120 that generates a distance value. If the meta data already includes the distance in meters or so, then the block 1120 simply extracts the data from a data stream or whatever forwards this information to the block 1140. Hence, a the same distance information for each DoA of each source in the same layer is generated and used by block 1140.

Based on the sound field description, a full band direction of arrival or a per band direction of arrival is determined in 1100. These direction of arrival information represent the direction of arrival data of the sound field. Based on this direction of arrival data, a translation transformation is performed in block 1110. To this end, block 1120 retrieves the meta data for the sound field description for a layer. Based on the data, block 1110 generates the new direction of arrival data for the sound field that, in this implementation, only depends on the translation from the reference location to the different reference location. To this end, block 1110 receives the translation information generated, for example, by a tracking in the context of a virtual reality implementation.

Advantageously or alternatively, a rotation data is used as well. To this end, block 1130 performs a rotation transformation using the rotation information. When both the translation and the rotation is performed, then it is of advantage to perform the rotation transformation subsequent to the calculation of the new DoAs of the sound field that already include the information from the translation and the layer distance from block 1120.

Then, in block 1140, the new sound field description is generated. To this end, the original sound field description can be used or, alternatively, source signals that have been separated from the sound field description by a source separation algorithm can be used or any other applications can be used. Basically, the new sound field description can be, for example, a directional sound field description as obtained by the Ambisonics generator 430 or as generated by a DirAC synthesizer 425 or can be a binaural representation generated from a virtual speaker representation in the subsequent binaural rendering.

Advantageously, as illustrated in FIG. 10, the distance per direction of arrival is also used in generating the new sound field description in order to adapt the volume or loudness of a certain sound source to the new location, i.e., the new or different reference location.

Although FIG. 10 illustrates a situation, where the rotation transformation is performed subsequent to the translation transformation, it is to be noted that the order can be different. Particularly, the rotation transformation can be applied to the DoAs of the sound field as generated by block 1100 and, then, the additional translation transformation is applied that is due to the translation of a subject from the reference location to the different reference location.

As soon as the DoAs of the sound field have been determined by block 1100, the distance information is acquired from the meta data using block 1120 and this distance information is then used by generating the new sound field description in block 1140 for accounting for a changed distance and, therefore, a changed loudness of the certain source with respect to a certain reference location. Basically, it can be said that in case the distance becomes larger, then the specific sound source signal is attenuated while, when the distance becomes shorter, then the sound source signal is amplified. Naturally, the attenuation or amplification of the certain sound source depending on the distance is made in proportion to the distance change, but, in other embodiments, less complex operations can be applied to this amplification or attenuation of sound source signals in quite coarse increments. Even such a less complex implementation provides superior results compared to a situation where any distance change is fully neglected.

Figure 7:
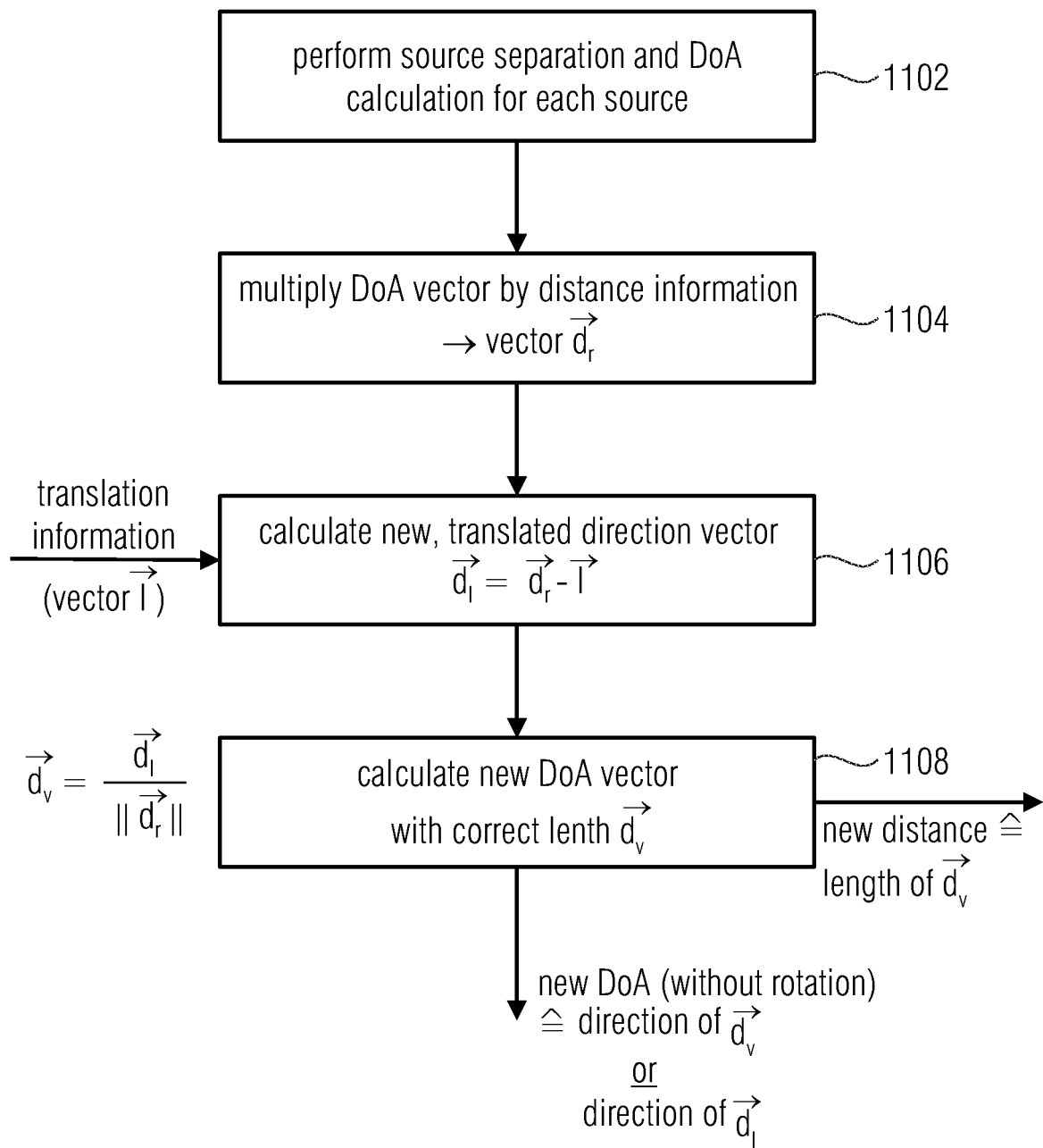
FIG. 7 illustrates an implementation for calculating a new DoA and a new distance of a sound source with respect to a new/different reference location.

FIG. 7 illustrates an implementation of the sound field calculator 420. In block 1102, a source separation and a direction of arrival or generally direction information calculation for each source is performed. Then, in block 1104, the direction of arrival vector is multiplied by the distance information vector, i.e., the vector from the original reference location to the sound source, i.e., the vector from item 520 to item 510 of FIG. 5, for example. Then, in block 1106, the translation information, i.e., the vector from item 520 to item 500 of FIG. 5 is taken into account in order to calculate the new translated direction vector that is the vector from the listener position 500 to the sound source position 510. Then, the new direction of arrival vector with the correct length indicated by $d_v$ is calculated in block 1108. This vector is directed in the same direction as $d_r$, but has a different length, since the length of this vector reflects the fact that the sound source 510 is recorded in the original sound field with a certain volume and, therefore, the length of $d_v$ more or less indicates the loudness change. This is obtained by dividing vector $d_l$ by the recording distance $d_r$, i.e., the length of vector $d_r$ from the microphone 520 to the sound source 510.

When, as in FIG. 5, the reproduced distance is greater than the recorded distance, then the length of $d_v$ will be lower than unity. This will result an attenuation of the sound source 510 for the reproduction at the new listener position. When, however, the reproduced distance $d_l$ is smaller than the recorded distance, then the length of $d_v$ as calculated by block 1108 will be greater than 1 and a corresponding scaling factor will result in an amplification of the sound source.

Figure 11:
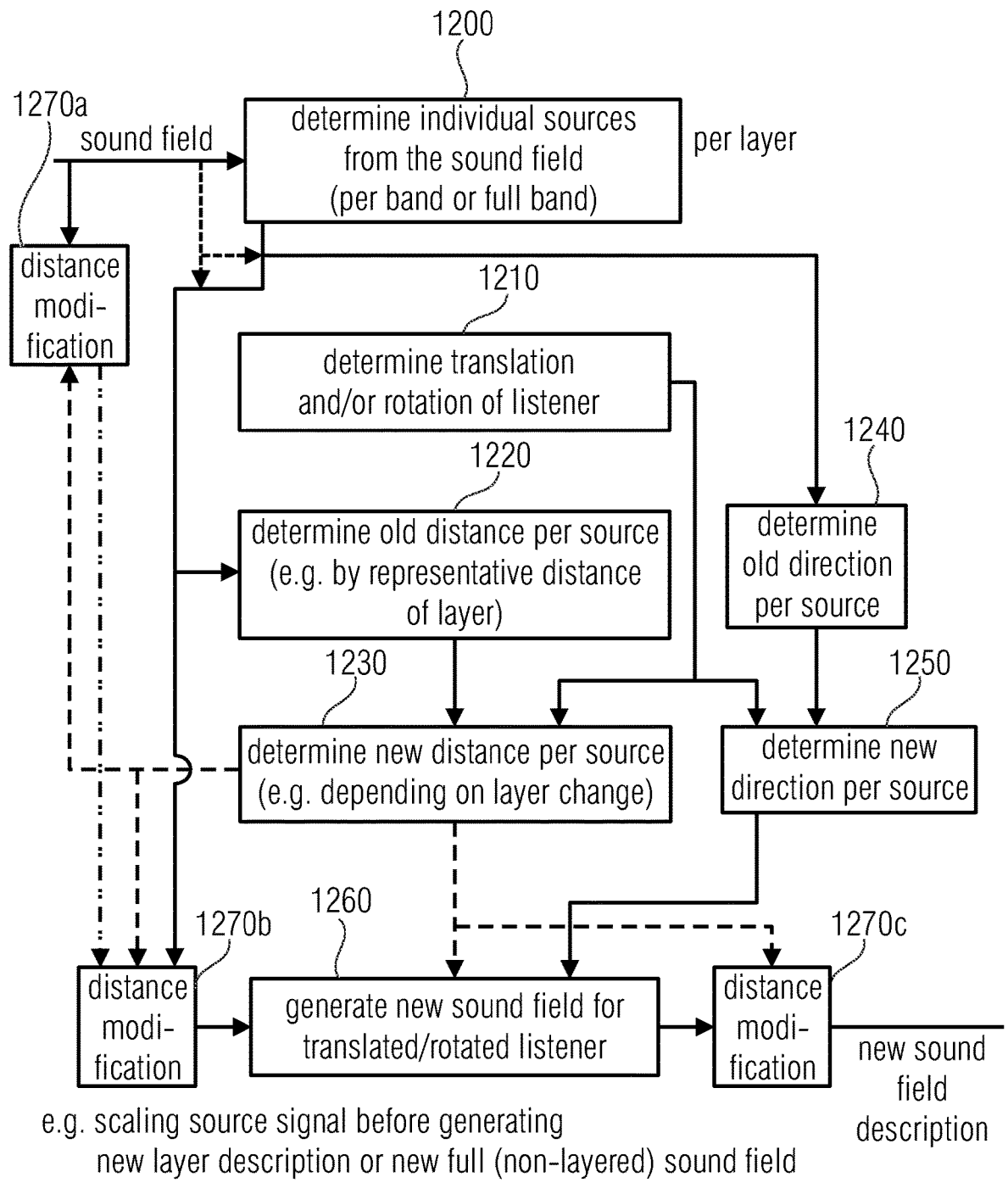
FIG. 11 illustrates a further implementation of an apparatus for generating a modified sound field description.

FIG. 11 illustrates a further implementation of the sound field calculator.

In block 1200, the individual sources from the sound field are determined, for example, per band or full band like. When a determination per frame and band is performed, then this can be done by a DirAC analysis. If a full band or subband determination is performed, then this can be done by any kind of a full band or subband source separation algorithm.

In block 1210, a translation and/or a rotation of a listener is determined, for example, by head tracking.

In block 1220, an old distance for each source is determined by using the meta data and, for example, by using the meta data for the layer such as the representative distance.

Thus, each band is considered to be a certain source (provided that the diffuseness is lower than a certain threshold), and then, a certain distance for each time/frequency bin having a low diffuseness value is determined.

Then, in block 1230, a new distance per source is obtained, for example, by a vector calculation per band that is, for example, discussed in the context of FIG. 7 or using the procedure of FIG. 8 relying on the detection of a layer change.

Furthermore, as illustrated in block 1240, an old direction per source is determined, for example, by a DoA calculation obtained in a DirAC analysis or by a direction of arrival or direction information analysis in a source separation algorithm, for example.

Then, in block 1250, a new direction per source is determined, for example by performing a vector calculation per band or full band.

Then, in block 1260, a new sound field is generated for the translated and rotated listener. This can be done, for example, by scaling the direct portion per channel in the DirAC synthesis. Depending on the specific implementation, the distance modification can be done in blocks 1270a, 1270b or 1270c in addition or alternatively to performing the distance modification in block 1260.

When, for example, it is determined that the sound field only has a single source, then the distance modification can already be performed in block 1270a.

Alternatively, when individual source signals are calculated by block 1200, then the distance modification can be performed for the individual sources in block 1270b, before the actual new sound field is generated in block 1260.

Additionally, when the sound field generation in block 1260, for example, does not render a loudspeaker setup signal or a binaural signal, but another sound field description, for example, using a Ambisonics encoder or calculator 430, then the distance modification can also be performed subsequent to the generation in block 1260, which means in block 1270c. Depending on the implementation, a distance modification can also be distributed to several modifiers so that, in the end, a certain sound source is in a certain loudness that is directed by the difference between the original distance between the sound source and the reference location and the new distance between the sound source and the different reference location.

FIG. 12a illustrates a DirAC analyzer as originally disclosed, for example, in the earlier cited reference "Directional Audio Coding" from IWPASH of 2009.

The DirAC analyzer comprises a bank of band filters 1310, an energy analyzer 1320, an intensity analyzer 1330, a temporal averaging block 1340 and a diffuseness calculator 1350 and the direction calculator 1360.

In DirAC, both analysis and synthesis are performed in the frequency domain. There are several methods for dividing the sound into frequency bands, within distinct properties each. The most commonly used frequency transforms include short time Fourier transform (STFT), and Quadrature mirror filter bank (QMF). In addition to these, there is a full liberty to design a filter bank with arbitrary filters that are optimized to any specific purposes. Regardless of the selected time-frequency transform, the design goal is to mimic the resolution of the human spatial hearing. The target of directional analysis is to estimate at each frequency band the direction of arrival of sound, together with an estimate if the sound is arriving from one or multiple directions at the same time. In principle, this can be performed with a number of techniques, however, the energetic analysis of sound field has been found to be suitable, which is illustrated in FIG.

12a. The energetic analysis can be performed, when the pressure signal and velocity signals in one, two or three dimensions are captured from a single position. In first-order B-format signals, the omnidirectional signal is called W-signal, which has been scaled down by the square root of two. The sound pressure can be estimated as $P=\sqrt{2}*W$, expressed in the STFT domain.

The X-, Y- and Z channels have the directional pattern of a dipole directed along the Cartesian axis, which form together a vector $U=[X, Y, Z]$. The vector estimates the sound field velocity vector, and is also expressed in STFT domain. The energy E of the sound field is computed. The capturing of B-format signals can be obtained with either coincident positioning of directional microphones, or with a closely-spaced set of omnidirectional microphones. In some applications, the microphone signals may be formed in a computational domain, i.e., simulated.

The direction of sound is defined to be the opposite direction of the intensity vector I. The direction is denoted as corresponding angular azimuth and elevation values in the transmitted meta data. The diffuseness of sound field is also computed using an expectation operator of the intensity vector and the energy. The outcome of this equation is a real-valued number between zero and one, characterizing if the sound energy is arriving from a single direction (diffuseness is zero), or from all directions (diffuseness is one). This procedure is appropriate in the case when the full 3D or less dimensional velocity information is available.

FIG. 12b illustrates a DirAC synthesis, once again having a bank of band filters 1370, a virtual microphone block 1400, a direct/diffuse synthesizer block 1450, and a certain loudspeaker setup or a virtual intended loudspeaker setup 1460. Additionally, a diffuseness-gain transformer 1380, a vector based amplitude panning (VBAP) gain table block 1390, a microphone compensation block 1420, a loudspeaker gain averaging block 1430 and a distributer 1440 for other channels is used.

In this DirAC synthesis with loudspeakers, the high quality version of DirAC synthesis shown in FIG. 12b receives all B-format signals, for which a virtual microphone signal is computed for each loudspeaker direction of the loudspeaker setup 1460. The utilized directional pattern is typically a dipole. The virtual microphone signals are then modified in non-linear fashion, depending on the meta data. The low bitrate version of DirAC is not shown in FIG. 12b, however, in this situation, only one channel of audio is transmitted as illustrated in FIG. 6. The difference in processing is that all virtual microphone signals would be replaced by the single channel of audio received. The virtual microphone signals are divided into two streams: the diffuse and the non-diffuse streams, which are processed separately.

The non-diffuse sound is reproduced as point sources by using vector base amplitude panning (VBAP). In panning, a monophonic sound signal is applied to a subset of loudspeakers after multiplication with loudspeaker-specific gain factors. The gain factors are computed using the information of a loudspeaker setup, and specified panning direction. In the low-bit-rate version, the input signal is simply panned to the directions implied by the meta data. In the high-quality version, each virtual microphone signal is multiplied with the corresponding gain factor, which produces the same effect with panning, however it is less prone to any non-linear artifacts.

In many cases, the directional meta data is subject to abrupt temporal changes. To avoid artifacts, the gain factors for loudspeakers computed with VBAP are smoothed by temporal integration with frequency-dependent time constants equaling to about 50 cycle periods at each band. This effectively removes the artifacts, however, the changes in direction are not perceived to be slower than without averaging in most of the cases.

The aim of the synthesis of the diffuse sound is to create perception of sound that surrounds the listener. In the low-bit-rate version, the diffuse stream is reproduced by decorrelating the input signal and reproducing it from every loudspeaker. In the high-quality version, the virtual microphone signals of diffuse stream are already incoherent in some degree, and they need to be decorrelated only mildly. This approach provides better spatial quality for surround reverberation and ambient sound than the low bit-rate version.

For the DirAC synthesis with headphones, DirAC is formulated with a certain amount of virtual loudspeakers around the listener for the non-diffuse stream and a certain number of loudspeakers for the diffuse steam. The virtual loudspeakers are implemented as convolution of input signals with a measured head-related transfer functions (HRTFs).

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

The inventive enhanced sound field description can be stored on a digital storage medium or a non-transitory storage medium or can be transmitted on a transmission medium such as a wireless transmission medium or a wired transmission medium such as the Internet.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a non-transitory data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods may be performed by any hardware apparatus.

The above-described embodiments merely represent an illustration of the principles of the present invention. It is understood that other persons skilled in the art will appreciate modifications and variations of the arrangements and details described herein. This is why it is intended that the invention be limited only by the scope of the following claims rather than by the specific details that have been presented herein by means of the description and the discussion of the embodiments.

REFERENCES

[1] Liitola, T., *Headphone sound externalization*, Ph.D. thesis, Helsinki University of Technology. Department of Electrical and Communications Engineering Laboratory of Acoustics and Audio Signal Processing, 2006.

[2] Blauert, J., *Spatial Hearing—Revised Edition: The Psychophysics of Human Sound Localization*, The MIT Press, 1996, ISBN 0262024136.

[3] Zhang, W., Samarasinghe, P. N., Chen, H., and Abhayapala, T. D., "Surround by Sound: A Re-view of Spatial Audio Recording and Reproduction," *Applied Sciences*, 7(5), p. 532, 2017.

[4] Bates, E. and Boland, F., "Spatial Music, Virtual Reality, and 360 Media," in *Audio Eng. Soc. Int. Conf. on Audio for Virtual and Augmented Reality*, Los Angeles, Calif., U.S.A., 2016.

[5] Anderson, R., Gallup, D., Barron, J. T., Kontkanen, J., Snavely, N., Esteban, C. H., Agarwal, S., and Seitz, S. M., "Jump: Virtual Reality Video," *ACM Transactions on Graphics*, 35(6), p. 198, 2016.

[6] Merimaa, J., *Analysis, Synthesis, and Perception of Spatial Sound: Binaural Localization Modeling and Multichannel Loudspeaker Reproduction*, Ph.D. thesis, Helsinki University of Technology, 2006.

[7] Kronlachner, M. and Zotter, F., "Spatial Trans-formations for the Enhancement of Ambisonics Recordings," in *2nd International Conference on Spatial Audio*, Erlangen, Germany, 2014.

[8] Tsingos, N., Gallo, E., and Drettakis, G., "Perceptual Audio Rendering of Complex Virtual Environments," *ACM Transactions on Graphics*, 23(3), pp. 249-258, 2004.

[9] Taylor, M., Chandak, A., Mo, Q., Lauterbach, C., Schissler, C., and Manocha, D., "Guided multi-view ray tracing for fast auralization," *IEEE Trans. Visualization & Comp. Graphics*, 18, pp. 1797-1810, 2012.

[10] Rungta, A., Schissler, C., Rewkowski, N., Mehra, R., and Manocha, D., "Diffraction Kernels for Interactive Sound Propagation in Dynamic Environments," *IEEE Trans. Visualization & Comp. Graphics*, 24(4), pp. 1613-1622, 2018.

[11] Thiergart, O., Kowalczyk, K., and Habets, E. A. P., "An Acoustical Zoom based on Informed Spatial Filtering," in *Int. Workshop on Acoustic Signal Enhancement*, pp. 109-113, 2014.

[12] Khaddour, H., Schimmel, J., and Rund, F., "A Novel Combined System of Direction Estimation and Sound Zooming of Multiple Speakers," *Radioengineering*, 24(2), 2015.

[13] Ziegler, M., Keinert, J., Holzer, N., Wolf, T., Jaschke, T., op het Veld, R., Zakeri, F. S., and Foessel, S., "Immersive Virtual Reality for Live-Action Video using Camera Arrays," in *IBC*, Amsterdam, Netherlands, 2017.

[14] Thiergart, O., Galdo, G. D., Taseska, M., and Habets, E. A. P., "Geometry-Based Spatial Sound Acquisition using Distributed Microphone Arrays," *IEEE Trans. Audio, Speech, Language Process.*, 21(12), pp. 2583-2594, 2013.

[15] Kowalczyk, K., Thiergart, O., Taseska, M., Del Galdo, G., Pulkki, V., and Habets, E. A. P., "Parametric Spatial Sound Processing: A Flexible and Efficient Solution to Sound Scene Acquisition, Modification, and Reproduction," *IEEE Signal Process. Mag.*, 32(2), pp. 31-42, 2015.

[16] Pulkki, V., "Spatial Sound Reproduction with Directional Audio Coding," *J. Audio Eng. Soc.*, 55(6), pp. 503-516, 2007.

[17] International Telecommunication Union, "ITU-R BS.1534-3, Method for the subjective assessment of intermediate quality level of audio systems," 2015.

[18] Thiergart, O., Del Galdo, G., Kuech, F., and Prus, M., "Three-Dimensional Sound Field Analysis with Directional Audio Coding Based on Signal Adaptive Parameter Estimators," in *Audio Eng. Soc. Conv. Spatial Audio: Sense the Sound of Space*, 2010.

[19] Kuttruff, H., *Room Acoustics*, Taylor & Francis, 4 edition, 2000.

[20] Borß, C., "A polygon-based panning method for 3D loudspeaker setups," in *Audio Eng. Soc. Conv.*, pp. 343-352, Los Angeles, Calif., USA, 2014.

[21] Rummukainen, O., Schlecht, S., Plinge, A., and Habets, E. A. P., "Evaluating Binaural Reproduction Systems from Behavioral Patterns in a Virtual Reality—A Case Study with Impaired Binaural Cues and Tracking Latency," in *Audio Eng. Soc. Conv.* 143, New York, N.Y., USA, 2017.

[22] Engelke, U., Darcy, D. P., Mulliken, G. H., Bosse, S., Martini, M. G., Arndt, S., Antons, J.-N., Chan, K. Y., Ramzan, N., and Brunnstrom, K., "Psychophysiology-Based QoE Assessment: A Survey," *IEEE Selected Topics in Signal Processing*, 11(1), pp. 6-21, 2017.

[23] Schlecht, S. J. and Habets, E. A. P., "Sign-Agnostic Matrix Design for Spatial Artificial Reverberation with Feedback Delay Networks," in *Proc. Audio Eng. Soc. Conf.*, pp. 1-10—accepted, Tokyo, Japan, 2018.

[31] M. A. Gerzon, "Periphony: With-height sound reproduction," *J. Acoust. Soc. Am.*, vol. 21, 110. 1, pp. 2-10, 1973.

[32] V. Pulkki, "Directional audio coding in spatial sound reproduction and stereo upmixing," in *Proc. of the 28th AES International Conference*, 2006.

[33] - -, "Spatial sound reproduction with directional audio coding," *Journal Audio Eng. Soc*, vol. 55, no. 6, pp. 503-516, June 2007.

[34] C. G. and G. M., "Coincident microphone simulation covering three dimensional space and yielding various directional outputs," U.S. Pat. No. 4,042,779, 1977.

[35] C. Faller and F. Baumgarte, "Binaural cue coding—part ii: Schemes and applications," *IEEE Trans. Speech Audio Process*, vol. 11, no. 6, November 2003.

[36] C. Faller, "Parametric multichannel audio coding: Synthesis of coherence cues," *IEEE Trans. Speech Audio Process.*, vol. 14, no. 1, January 2006.

[37] H. P. J. E. E. Schuijers, J. Breebaart, "Low complexity parametric stereo coding," in *Proc. of the* 116*th A ES Convention*, Berlin, Germany, 2004.

[38] V. Pulkki, "Virtual sound source positioning using vector base amplitude panning," *J. Acoust. Soc. Am*, vol. 45, no. 6, pp. 456-466, June 1997.

[39] J. G. Tylka and E. Y. Choueiri, "Comparison of techniques for binaural navigation of higher-order ambisonics sound fields," in *Proc. of the AES International Conference on Audio for Virtual and Augmented Reality*, New York, September 2016.

What is claimed is:

1. An apparatus for generating an enhanced sound field description, comprising:
    a sound field generator for generating a first sound field description with respect to a reference location, wherein the first sound field description comprises sound data only from sound sources located in a first volume around the reference location, and a second sound field description with respect to the reference location, wherein the second sound field description comprises sound data only from second sources located in a second volume around the reference location, the second volume being different from the first volume; and
    a meta data generator for generating, as meta data relating to spatial information of the sound field, a spatial description of the first volume and/or the second volume,
    wherein the first sound field description, the second sound field description, and the meta data constitute the enhanced sound field description.

2. The apparatus of claim 1,
    wherein the first volume is a sphere around the reference location and wherein the second volume is a spherical shell around the reference location, the spherical shell comprising a diameter being greater than the diameter of the sphere, or
    wherein the first volume is a first spherical shell, and the second volume is a second spherical shell, wherein a diameter of the first spherical shell is lower than a diameter of the second spherical shell,
    wherein the meta data generator is configured to provide, as the spatial description of the first volume and/or the second volume, a spatial description of the sphere and the spherical shell or the first spherical shell and the second spherical shell.

3. The apparatus of claim 1,
    wherein the first sound field description and the second sound field description are Ambisonics descriptions or DirAC descriptions.

4. The apparatus of claim 1,
    wherein the sound field generator is configured to determine the first volume and the second volume statically or dependent on the sound field.

5. The apparatus of claim 1,
    wherein the meta data generator is configured to determine a distance range for each of the first sound field description and the second sound field description, the distance range being uniform for each volume or non-uniform, wherein, when the distance range is non-uniform for each volume, a distance range for a volume extending further away from the reference location is greater than a distance range more close to the reference location.

6. The apparatus of claim 1, further comprising an output interface for generating an output signal for transmission or storage, the output signal comprising, for a time frame, at least two audio signals derived from the first sound field and the second sound field and the spatial information for the time frame.

7. The apparatus of claim 1,
    wherein the metadata generator is configured to generate, as the spatial description of the first volume and/or the second volume a first geometrical information for the first volume, and a second geometrical information for the second volume.

8. The apparatus of claim 7,
    wherein the first geometrical information is a first representative distance from the first volume to a reference point;
    wherein the second geometrical information is a second representative distance from the second volume to the reference point, wherein the reference point is the reference location or vector pointing from the reference location to the reference point.

9. An apparatus for generating an enhanced sound field description, comprising:
    a sound field generator for generating, for each layer of a plurality of layers, a DirAC description of a sound field comprising one or more downmix signals and individual direction data and optionally diffuseness data for different time-frequency bins; and
    a meta data generator for generating, as meta data relating to spatial information of the sound field, a single distance information item for each layer,
    wherein the DirAC descriptions for the plurality of layers and the meta data constitute the enhanced sound field description.

10. A method of generating an enhanced sound field description, comprising:
    generating a first sound field description with respect to a reference location, wherein the first sound field description comprises sound data only from sound sources located in a first volume around the reference location, and a second sound field description with respect to the reference location, wherein the second sound field description comprises sound data only from second sources located in a second volume around the reference location, the second volume being different from the first volume; and
    generating, as meta data relating to spatial information of the sound field, a spatial description of the first volume and/or the second volume,
    wherein first sound field description, the second sound field description, and the meta data constitute the enhanced sound field description.

11. A non-transitory digital storage medium having stored thereon a computer program for performing, when said computer program is run by a computer, a method of generating an enhanced sound field description, comprising:
    generating a first sound field description with respect to a reference location, wherein the first sound field description comprises sound data only from sound sources located in a first volume around the reference location, and a second sound field description with respect to the reference location, wherein the second sound field description comprises sound data only from second sources located in a second volume around the reference location, the second volume being different from the first volume; and generating, as meta data relating to spatial information of the sound field, a spatial description of the first volume and/or the second volume, wherein the first sound field description, the second sound field description, and the meta data constitute the enhanced sound field description.

12. A method of generating an enhanced sound field description, comprising:

generating, for each layer of a plurality of layers, a DirAC description of a sound field comprising one or more downmix signals and individual direction data and optionally diffuseness data for different time-frequency bins; and generating, as meta data relating to spatial information of the sound field, a single distance information item for each layer, wherein the DirAC descriptions for the plurality of layers and the meta data constitute the enhanced sound field description.

13. A non-transitory digital storage medium having stored thereon a computer program for performing, when said computer program is run by a computer, a method of generating an enhanced sound field description, comprising:

generating, for each layer of a plurality of layers, a DirAC description of a sound field comprising one or more downmix signals and individual direction data and optionally diffuseness data for different time-frequency bins; and generating, as meta data relating to spatial information of the sound field, a single distance information item for each layer, wherein the DirAC descriptions for the plurality of layers and the meta data constitute the enhanced sound field description.

* * * * *